(12) United States Patent
Yamamoto et al.

(10) Patent No.: US 7,228,339 B2
(45) Date of Patent: Jun. 5, 2007

(54) INFORMATION STORAGE OUTPUT SYSTEM AND INFORMATION STORAGE OUTPUT SERVICE

(75) Inventors: Hiroshi Yamamoto, Toda (JP); Hiroshi Yamaguchi, Shizuoka-ken (JP); Tsunehiro Motegi, Tokyo (JP); Katsuo Shioiri, Yokohama (JP); Hirofumi Harada, Irving, CA (US); Keishi Higashi, Hino (JP); Mitsuya Sato, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 808 days.

(21) Appl. No.: 10/283,364

(22) Filed: Oct. 30, 2002

(65) Prior Publication Data

US 2003/0093490 A1 May 15, 2003

(30) Foreign Application Priority Data

Oct. 31, 2001 (JP) ............................ 2001-335428

(51) Int. Cl.
*G06F 15/16* (2006.01)
*G06F 15/173* (2006.01)
*G06F 15/00* (2006.01)
*H04K 1/00* (2006.01)
*H04N 1/00* (2006.01)
*H04M 17/00* (2006.01)

(52) U.S. Cl. ...................... 709/217; 709/203; 709/219; 709/225; 709/227; 358/1.15; 358/1.13; 713/182; 713/185; 713/402; 379/144.01

(58) Field of Classification Search ................ 709/217, 709/219, 225; 713/185
See application file for complete search history.

(56) References Cited

U.S. PATENT DOCUMENTS 6,243,450 B1 * 6/2001 Jansen et al. .......... 379/144.01

(Continued)

FOREIGN PATENT DOCUMENTS

JP 11-146118 A 5/1999

(Continued)

*Primary Examiner*—Bunjob Jaroenchonwanit
*Assistant Examiner*—Philip C. Lee
(74) *Attorney, Agent, or Firm*—Foley & Lardner LLP

(57) ABSTRACT

There is provided an information storage output system enhanced in mobility and improved in convenience to use. In the information storage output system for storing predetermined storage data in a storage server on a network, the storage server can be accessed from many and unspecified communication devices. The information storage output system includes a plurality of remote output terminals for outputting supply data supplied via a network in a predetermined output form, a remote output server having a function of supplying at least the supply data to one of the remote output terminals, and an output request communication terminal for transmitting a primary output request of the storage data to the storage server or the remote output server via a network. The storage data is output from the remote output terminal in response to the primary output request transmitted from the output request communication terminal.

12 Claims, 14 Drawing Sheets

U.S. PATENT DOCUMENTS

| | | | |
|---|---|---|---|
| 6,362,892 B1 * | 3/2002 | Lee et al. | 358/1.13 |
| 6,623,527 B1 * | 9/2003 | Hamzy | 715/513 |
| 6,754,825 B1 * | 6/2004 | Lennie et al. | 713/181 |
| 6,757,070 B1 * | 6/2004 | Lin et al. | 358/1.1 |
| 6,856,432 B2 * | 2/2005 | Bobrow et al. | 358/402 |
| 2001/0013053 A1 * | 8/2001 | Yamazaki | 709/203 |
| 2002/0041399 A1 * | 4/2002 | Ichikawa | 358/402 |
| 2002/0102965 A1 * | 8/2002 | Mandahl et al. | 455/412 |
| 2004/0218226 A1 * | 11/2004 | Antognini et al. | 358/402 |
| 2005/0193122 A1 * | 9/2005 | Feinleib et al. | 709/227 |

FOREIGN PATENT DOCUMENTS

| | | |
|---|---|---|
| WO | WO 01/52047 A1 | 7/2001 |

* cited by examiner

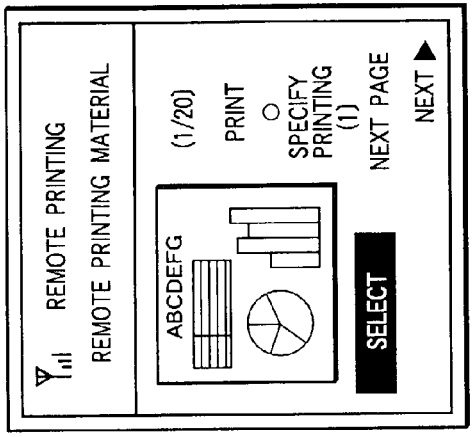
Fig.10C PICTURE M3
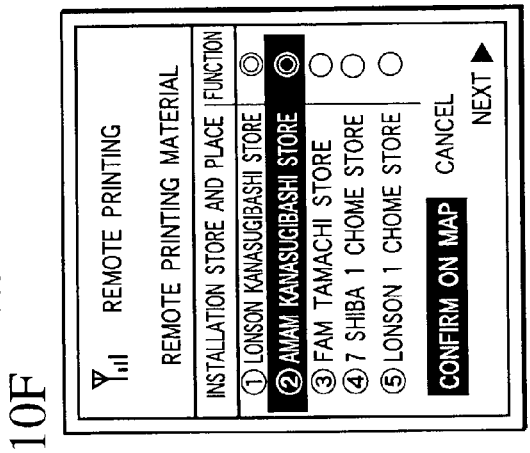
Fig.10F PICTURE M6
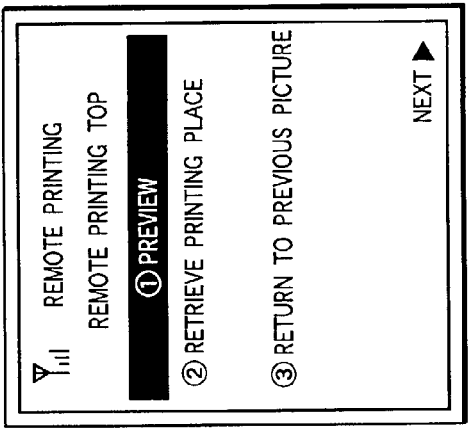
Fig.10B PICTURE M2
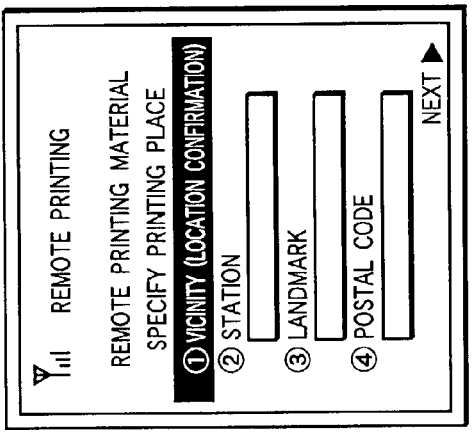
Fig.10E PICTURE M5
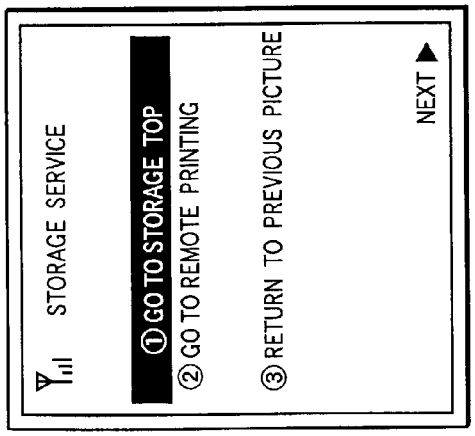
Fig.10A PICTURE M1
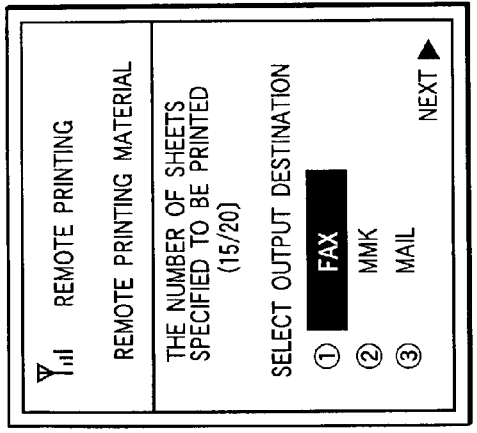
Fig.10D PICTURE M4

PICTURE M7

Fig.12

Fig.13A  MEMBER MASTER FILE

| NO. | REMOTE PRINTING ID | PASSWORD | PORTABLE TELEPHONE NUMBER |
|---|---|---|---|
| 1 | yamamoto | **** | 090-1234-5678 |
| 2 | harahara | **** | 090-1111-1111 |
| 3 | yamagucchi | **** | 090-1234-4321 |
| 4 | higa | **** | 090-2222-2222 |
| 5 | sato | **** | 090-9999-9999 |

Fig.13B  STORAGE RELATING FILE CLASSIFIED BY MEMBER

| NO. | REMOTE PRINTING ID | STORAGE ID | | | | |
|---|---|---|---|---|---|---|
| | | STORAGE A | STORAGE B | STORAGE C | STORAGE D | STORAGE E |
| 1 | yamamoto | yamamoto | yaya | | | |
| 2 | harahara | | harada | | | |
| 3 | yamagucchi | | | yamagoo | | |
| 4 | higa | higashi | | | | john |
| 5 | sato | | | | satomi | |

Fig.13C  USE HISTORY FILE CLASSIFIED BY MEMBER
REMOTE PRINTING ID : yamamoto

| DATE | OUTPUT MEDIUM | FILE NAME | STORAGE ID | THE NUMBER OF OUTPUT PAGES | OUTPUT PAGES | OUTPUT PAPER | OUTPUT METHOD | THE NUMBER OF OUTPUT COPIES | CHARGE(YEN) |
|---|---|---|---|---|---|---|---|---|---|
| 2001/10/10 | ELECTRONIC MAIL | REPORT.ppt | A | 10 | 1-10 | | | | 90 |
| 2001/10/11 | MMK | ABC.doc | A | 120 | 1-24 | A4 ORDINARY | ONE SIDE | 5 | 2400 |
| 2001/10/12 | FAX | REPORT.ppt | B | 5 | 1,5,10,15,16 | | | | 55 |
| 2001/10/13 | FAX | PLOBLEM.ppt | E | 11 | 1-5, 7-13 | | | | 150 |
| 2001/10/14 | MMK | TEC.ppt | C | 35 | 1,5,10,15,16 | A4 ORDINARY | BOTH SIDES | 7 | 550 |

(PRINTING SETTING DATA)

Fig.14

STORAGE SERVICE

ID ☐ PW ☐

☑ 1  FILE 1
☐ 2
☐ 3
☑ 4
☐ 5
☐ 6

PRINT

CHECK BOX

INFORMATION STORAGE OUTPUT SYSTEM AND INFORMATION STORAGE OUTPUT SERVICE

TECHNICAL BACKGROUND

The present invention relates to a storage system, and in particular to a storage system suitable for, for example, the case where storage service provided on Internet is utilized.

Conventionally, when utilizing storage service provided by storing desired data in a storage server disposed on Internet, a plurality of users who attempt to share the data basically request that the data should be downloaded in a form similar to perusal of web pages by using a personal computer with a browser installed therein, although they are supported by plug-in software. The data are downloaded to the personal computer that has issued the request. In this sense, when seen from the client side such as a personal computer, the storage server can be said to be a kind of the web server.

As for data stored in the storage server and opened to the public, anyone can download the data via Internet by using a URL of the data. By conveying the URL, therefore, wide area data sharing can be easily realized.

In recent years, expansion of various portable information terminals including portable telephones (cell phones) is remarkable. The number of portable information terminals having a web browser installed therein is large, and the degree of spread is also high. Therefore, it is widely conducted to peruse web pages on the Internet while moving by using portable information terminals.

In portable telephones, however, the capacity of a storage device that can be mounted is usually much smaller than that of a personal computer. Since there are thus many restrictions in the perusal environment, the size and form of web pages that can be perused are inevitably restricted. In addition, since portable telephones typically have no printout function, the output form is also limited to screen display output. Therefore, data stored in the storage server cannot be sufficiently utilized if they are used for only portable telephones, and there is a limit in sharing as well.

If a personal computer connected to a printer in home or a company is used, then it is possible to peruse and print out data stored in the storage server. However, the restriction on the place is great. From the viewpoint of mobility, therefore, a high degree of freedom as in the case where a portable telephone is used cannot be obtained, resulting in an obstacle to sufficient sharing.

SUMMARY OF THE INVENTION

In order to solve the problems, in accordance with a first aspect of the present invention, there is provided an information storage output system for storing predetermined storage data in a storage server on a network, the storage server being capable of being accessed from many and unspecified communication devices, the information storage output system including: a plurality of remote output terminals for outputting supply data supplied via a network in a predetermined output form; a remote output server having a function of supplying at least the supply data to one of the remote output terminals; and an output request communication terminal for transmitting a primary output request of the storage data to the storage server or the remote output server via a network, wherein the storage data is output from the remote output terminal in response to the primary output request transmitted from the output request communication terminal.

In accordance with a second aspect of the present invention, there is provided an information storage output service for storing predetermined storage data in a storage server on a network, the storage server being capable of being accessed from many and unspecified communication devices, wherein a primary output request of the storage data is transmitted to the storage server or the remote output server via a network by using a predetermined output request communication terminal, a remote output server supplies at least the supply data to one of the remote output terminals in response to the primary output request, and the remote output terminal that has received the supply data via a network outputs the supply data in a predetermined output form.

BRIEF DESCRIPTION OF THE DRAWINGS

FIG. 10 is a schematic diagram showing an example of a display screen on a portable telephone or an MMK terminal in a storage system according to an embodiment;

FIG. 12 is a schematic diagram showing an example of a display screen on an MMK terminal in a storage system according to an embodiment;

FIG. 13 is a schematic diagram showing an example of a logical configuration of each database used in a storage system according to an embodiment; and FIG. 14 is a schematic diagram showing an example of a display screen on a portable telephone in a storage system according to an embodiment.

PREFERRED EMBODIMENT (A) Embodiment

Hereafter, an embodiment will be described by taking the case where an information storage output system and information storage output service are applied to a storage server and a remote printing server (storage service and remote printing service) disposed on the Internet, as an example.

In general, on-line storage service provided by a storage server refers to such service that a user file accommodating user data transmitted by each user is stored in a dedicated data storage region provided on a network and the user file can be read out in response to an output request from the user and overwritten as occasion demands, However, details of this service are multifarious according to the service provider.

In other words, the kinds of the user data are diverse, and, for example, there may be images, dynamic images, documents, commodity catalogues, program codes, and software packages. In some services, reading and writing user data are allowed. On the other hand, in other services, data can be read, but cannot be written. In addition, charges are collected or not collected according to the data storage (capacity of consumed disks) and readout. In some of services in which charges are not collected, a profit is realized by an advertisement rate income or the like. There are also examples in which even the profit realizing using the advertisement rate income is not conducted and service is provided to some specific users (such as users who have purchased specific software products such as a computer program product embodied in computer readable medium (software whereby the users can function as clients of the storage server)) as perfect free service. In the case of free service, however, it can also be considered that the cost caused by service providing is contained in the product price.

As for the method for implementing the mechanism of the storage server that provides such service, on an existing system, various methods are considered. (As an example, even if access is effected from simple FTP clients by using an anonymous FTP server, it is possible to open certain user data to many and unspecific users and make them download the user data.) Actually, however, most methods are implemented by utilizing a hypertext system.

Hereafter, an embodiment will be described by taking a storage server constructed on a hypertext system as an example with due regard to convenience of access from a portable telephone having an existing browser installed therein.

(A-1) Configuration of Embodiment

Figure 1:
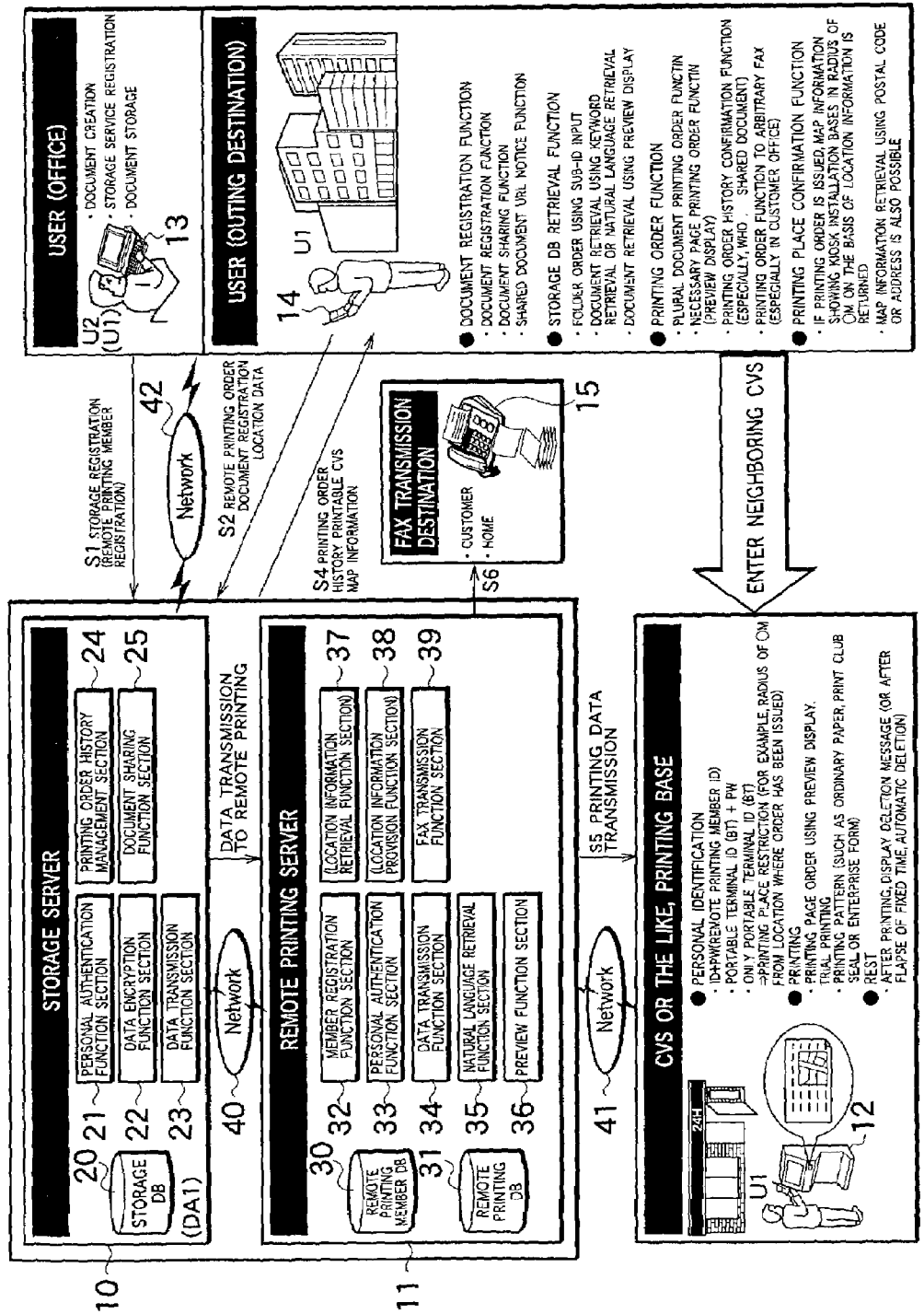
FIG. 1 is a schematic diagram showing an example of a whole configuration concerning a principal part of a storage system according to an embodiment.

An example of a configuration of a whole storage system of the present embodiment is shown in FIG. 1.

In FIG. 1, the storage system includes a storage server 10, a remote printing server 11, an MMK (multimedia kiosk) terminal 12, a personal computer 13, a portable telephone 14, a FAX terminal 15, and networks 40 to 42.

Among them, any of the networks 40 to 42 is formed of Internet. As another example, the network 41, which accommodates the MKK terminal 12, can also be formed as a LAN accommodating a plurality of MMK terminals. Communication between the portable telephone 14 and the storage server 10 is conducted via the network 40, which is Internet, and a portable telephone network, which is not illustrated. In addition, communication between the FAX terminal 15 and the remote printing server 11 is conducted via the network 40, which is Internet, and a FAX network, which is not illustrated.

As described above, the storage server 10 provides an interface serving as a web server. Therefore, the storage server 10 can be accessed from the portable telephone 14 and the personal computer 13 having a browser installed therein, by basically using the HTTP.

An internal configuration example of the storage server 10 is shown in FIG. 1.

In other words, the storage server 10 includes a storage database 20, a personal authentication function 21, a data encryption function section 22, a data transfer function section 23, a printing order history management section 24, and a document sharing function section 25.

Among them, the storage database 20 is a portion that corresponds to the above described dedicated data storage region. In order to implement a massive storage capacity and a nonvolatile storage, however, a physical substance of the storage database 20 is typically a hard disk having a large capacity. As a matter of course, since the storage database 20 is a database, a user U1 who operates the portable telephone 14 can easily execute data retrieval without being conscious of physical storage structures of respective data, owing to a function of DBMS, which is not illustrated.

In the following description, attention will be paid to certain data DA1 stored in the database 20.

The kind of the data DA1 may be, for example, the image, dynamic image, document, commodity catalogue, program code, and software package. For example, in the case of a document file having a small size, it is possible to peruse the document file by using a browser of the portable telephone 14. In that case, however, it is necessary to use a remote printing system of the present embodiment including a remote printing server and MMK terminals, when printing the document. Furthermore, in the case of a document file having a large size, perusal itself cannot be conducted in the portable telephone 14. Therefore, it may happen to use the remote printing system for the purpose of only perusing (without printing).

It is a matter of course that data stored in the database 20 includes not only images and documents, which are main data (one of the main data is DA1), but also attribute information (such as a name of a person who has registered the main data, date of registration, whether there is a restriction on access authority to the main data, and contents of restriction) associated with the main data and used to manage the main data.

The personal authentication function section 21 is a portion for verifying the legitimacy of a user who has accessed the storage server 10 (an example thereof is a user U1 by using the portable telephone 14).

The present embodiment is premised on a membership system, and only users who have effected member registration in both the storage server 10 and the remote printing server 11 are authenticated as legitimate users. In the case where the storage server 10 and the remote printing server 11 are coupled with a confidence relation, however, the user U1 can utilize the present system, if the user U1 is a member of either the storage server 10 or the remote printing server 11. If in this case a user ID is authenticated in one of the servers, then the user ID is handled as authenticated one in the other of the servers as well.

The personal authentication function section 21 is connected to a storage service member database, which stores IDs (identification information for uniquely identifying respective members in the storage server) and passwords of respective members. If there is access from a user, then the personal authentication function section 21 collates an ID and a password transmitted from the user with those stored in the storage service member database, and thereby verifies the legitimacy.

The storage service member database may be disposed in the storage server 10, may be disposed in the remote printing server 11, or may be disposed in both the storage server 10 and the remote printing server 11. In the case where the storage service member database is disposed in both the storage server 10 and the remote printing server 11, however, it is necessary to consider so as to maintain the consistency of the data.

If a password of a plain sentence is transmitted on Internet, the possibility that the password will be stolen is not low. Therefore, it is desirable to use some encryption technique. For example, it is also considered to make the most of the SSL, which is widely spread on hypertext systems. If, as an example, encryption information (which includes ID information and password information) obtained by encrypting an ID by using a password as an encryption key is transmitted, the load imposed on the processing capability of the portable telephone 14 side can be made smaller than that of the ordinary SSL.

If only member registration is conducted by using not a portable telephone but a personal computer, then the ordinary SSL can be utilized as it is, resulting in enhanced security.

If files uploaded to the storage server 10 by respective users (such as files accommodating data DA1) are managed by using a directory of a tree structure and one node of the tree is assigned as a home directory that represents each user (such as U1), then all files uploaded by the user can be stored in the home directory as a leaf of the tree (where the leaf means a node of the lowest order layer).

At the time of downloading, therefore, it becomes possible to efficiently display a list of files uploaded by the user, by inputting a URL that indicates the home directory name to the browser. Varying the stored directory between files opened to the public and files that are not opened to the public is effective for efficient file management.

The data encryption function section 22 is a portion that conducts encryption when transmitting information and conducts decryption when receiving the encrypted information. The information can contain not only the ID and password handled by the personal authentication function section 21, but also the main data DA1 stored in the storage database 20. If the main data are opened to the public without setting restrictions on the access authority of the main data DA1, however, then it is considered that the necessity of encrypting the main data DA1 when transmitting it is low.

In the case of the storage server of the present embodiment connected to the network 40, which is Internet, the data transmission function section 23 is a portion that executes processing corresponding to the HTTP protocol besides the processing of a lower order layer such as the TCP/IP. The data transmission function section 23 provides the Internet 40 with an interface for serving as a web server.

In other words, in the storage server 10, the data transmission function section 23 can be regarded as a web server, and other components, such as especially the storage database 20, can be regarded as other servers connected so as to be able to cooperate with the web server by using the CGI or the like.

Although the processing executed by the data transmission function section 23 is basically the ordinary HTTP protocol, there is a portion different from the ordinary HTTP.

When accessing the web server, the browser in the portable telephone 14 and the personal computer automatically transmits the IP address, the browser name, and version information to the web server side, even if the user U1 is not aware thereof. By utilizing these kinds of information, the web server transmits a web page to the accessing browser in such a form as to conform to the browser. However, it is necessary for the web server (i.e., the data transmission function section 23) of the present embodiment to transmit a web page (the main data DA1) not to the browser of the accessing portable telephone 14, but to the remote printing server 11.

The printing order history management section 24 is a portion for storing and managing history information (access log) as shown in, for example, FIG. 13(C) that relates to a printing order received from the portable telephone 14. The printing order means that the user (such as U1) orders the main data (such as data DA1) to be printed. However, a peripheral device, such as a printer or a FAX, connected to the MMK terminal 12, which cooperates with the remote printing server 11, executes the printing.

In some cases, the MMK terminal 12 does not conduct printing of the data DA1, but conducts only perusal. Therefore, it is not always necessary that printing is executed as a result of the printing order. As occasion demands, the charge in the case where printing is executed may be made different from that in the case where only screen display (perusal) is conducted.

Storing such history information is useful not only for charging, but also for security improvement.

The document sharing function section 23 is a portion that functions when the main data DA1 is a document read/written by a plurality of sharing persons, such as a schedule table. For example, it is now assumed that the user U1 and a user U2 must talk with each other in conference several days after, but it is difficult to get into direct communication with each other. If in such a case the user U1 enters his or her detailed schedule in the schedule table DA1, then the user U2 can adjust his or her schedule and attend a conference in the same time zone. If the schedule of the user U2 himself or herself after the adjustment is also entered in the data DA1, which is the shared file, then it becomes possible for the user U1 as well to know the time zone in which the user U1 can meet the user U2 by watching the schedule table DA1 whenever it suits the user U1.

In such a case, the schedule table DA1, which is a shared file, can be read, written, and altered many times. When the number of sharing persons is large, it may occur that data is read/written simultaneously by a plurality of users and consequently the document sharing function section 25 becomes necessary.

On the other hand, the remote printing server 11 connected to the storage server 10 via the Internet 40 includes a remote printing member database 30, a remote printing database 31, a member registration function section 32, a personal authentication function section 33, a data transmission function section 34, a natural language retrieval function section 35, a preview function section 36, a location information retrieval function section 37, a location information provision function 38, and a FAX transmission function section 39.

Among them, the remote printing member database 30 is a database for registering an ID and a password (PW) of a user (such as U1) registered in the remote printing server 11. As occasion demands, the access log of each member may be stored in the database 30.

Originally, the storage server 10 and the remote printing server 11 can function respectively independently. Even if membership is adopted, therefore, member registration of them are conducted respectively independently. However, the present embodiment may be formed so as to automatically collect member information of the storage server 10 when registering a member in the remote printing server 11, laying stress on cooperation between the storage server 10 and the remote printing server 11.

In remote printing service, which will be started from now and which is not yet known to typical portable telephone users much as compared with the storage service, which is already worked widely and which can gather a large number of members, it is not always easy to secure a sufficient number of registered members in some cases. If registration of a member in the storage server 10 automatically causes registration of the member in the remote printing server 11 as well, it becomes easy to secure members on the remote printing service side. In this case, it becomes an indispensable condition to construct a confidence relation between the storage server 10 and the remote printing server 11.

In the case where the remote printing server 11 is installed and operation of the storage server 10 is started at the same time that operation of the remote printing server 11 is started, it is supposed that member registration can be conducted only in the remote printing server. In that case, with respect to corresponding data items, contents of the storage service member database of the storage server 10 become completely the same as contents of the remote printing member database 30.

Furthermore, it is not necessary to limit the number of storage servers that cooperate with one remote printing server (such as 11) to one, but a plurality of storage servers may cooperate with one remote printing server.

The remote printing database 31 is a database that temporarily stores the data DA1 and stores information concerning the place where the MMK terminal 12 is installed. The MMK terminal 12 can be installed anywhere in urban districts. For example, however, it is desirable to install the MMK terminals 12 in places where typical users easily drop in, such as convenience stores (CVSs) and stations, uniformly and with high density as far as possible.

The member registration function section 32 is a portion that executes member registration into the remote printing server 11 in cooperation with member registration into the storage server 10. Information of the registered member is stored in the remote printing member database 30.

The personal authentication function section 33 is a portion corresponding to the personal authentication function section 21. The data transmission function section 34 is a portion corresponding to the data transmission function section 23.

Whereas the personal authentication function section 21 functions when accessing the storage server 10 in the portable telephone 14 or the personal computer 13, the personal authentication function section 33 is a portion that functions when accessing the remote printing server 11 via the MMK terminal 12 and when accessing the remote printing server 11 in order to use polling from the FAX terminal 15.

Whereas the data transmission function section 23 conducts communication with the portable telephone 14, the personal computer 13, or the remote printing server 11, the data transmission function section 34 is a portion that function when receiving the main data (such as DA1) from the storage server 10 or when transmitting the main data to the MMK terminal (such as 12).

As for a major flow of processing in the present embodiment, first, the portable telephone 14 or the personal computer 13 accesses the storage server 10 to issue a printing order. Subsequently, the MMK terminal (such as 12) accesses the remote printing server 11 to advance processing for effecting printing outputting or screen display. In the case where even a printing place is necessarily specified at a stage where the storage server 10 is accessed, therefore, it becomes unnecessary to specify the printing place or the like on the MMK terminal.

If necessary, the following simple procedure may be used: the printing place or the like is not specified at any stage; only specification of output data DA1 is conducted at the access stage of the storage server 10; and if a user who has conducted the specification inputs an ID or the like from any MMK terminal, then the printing outputting and screen display outputting are effected from the MMK terminal unconditionally.

In the case where there is a bottleneck having a slow line speed anywhere on a line between the storage server 10 and the MMK terminal 12 for transmitting the data DA1, the possibility that the user is kept waiting before the MMK terminal for a long time becomes high if the data DA1 is a file having a large size, such as an image. Therefore, it is desirable to eliminate such a bottleneck and ensure a sufficient line rate.

In the case where the data DA1 is downloaded to a dial-up IP connected personal computer (such as 13) of home, the bottleneck is a telephone line (having a rate of 56 kbps in the case of an analog line and a rate of 64 kbps or 128 kbps in the case of an ISDN) serving as an access line in many cases. In the case of an MMK terminal, however, it is easy to use a faster line such as a private line or an ADSL, and consequently the possibility that a sufficient line rate is obtained is high.

The preview function section 36 is a portion having a function of displaying a preview picture M3 (see FIG. 10(C)) for schematically showing a printing result on a portable telephone before actually effecting printing.

The location information retrieval function section 37 is a portion for acquiring location information that indicates locations of users (to be exact, portable telephones) stored for the purpose of conducting the so-called paging in the portable telephone network, from the portable telephone network. The location information retrieval function section 37 functions when the user desires a printing output from an MMK terminal located near the user as close as possible (i.e., when the user has selected "vicinity (location confirmation)" on a picture M5).

On the contrary, the location information provision function section 38 is a portion that provides the portable telephone with information for displaying a list, such as a picture M6 shown in FIG. 10(F), including candidates of the printing place on the screen according to the retrieval result of the remote printing database 31.

Also in the case where "vicinity (location confirmation)" has been selected on the picture M5, such a list is displayed on the screen. At that time as well, the location information provision function section 38 functions in order to create the list.

Finally, the FAX transmission function section 39 is a portion that functions in order to transmit the data DA1 received from the storage server 10 to the FAX terminal (such as 15) when the user has selected "FAX" on a picture M4 displayed on the screen of the portable telephone.

If it is not necessary to conduct transmission from the remote printing server 11 to the FAX terminal, this function can be omitted.

In the foregoing description, the storage server 10 and the remote printing server 11 are two servers. Considering properties of the function sections 20 to 25 and 30 to 39, it is considered to be normal in practical mounting to form each function section by using a different server (i.e., a different computer). Therefore, it is considered to be normal to form one site of the storage server 10 and form another site of the remote printing server 11.

Hereafter, operation of the present embodiment having the configuration heretofore described will be described with reference to operation sequences of FIGS. 2 to 9.

Figure 2:
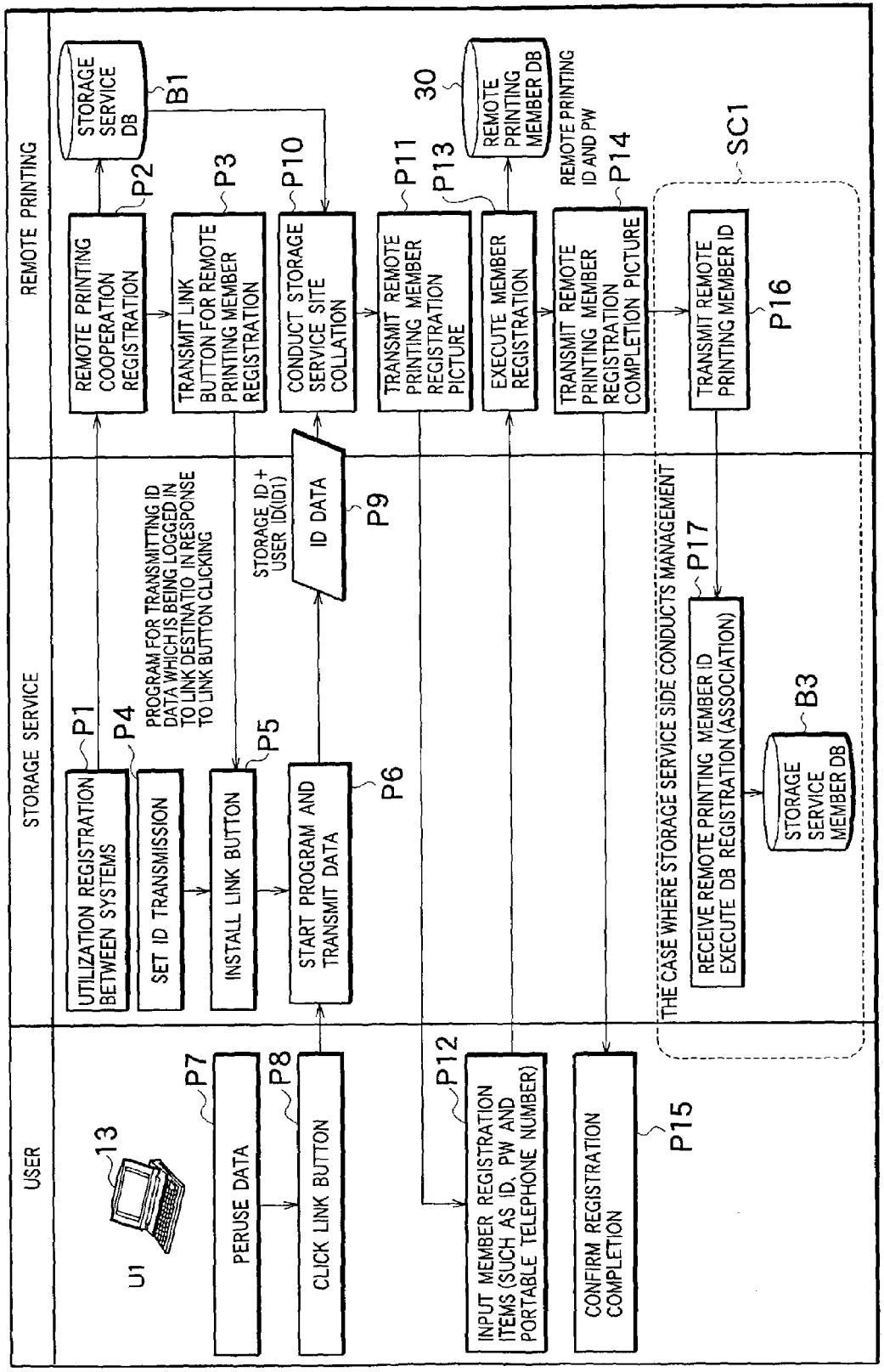
FIG. 2 shows an operation sequence at the time of registration of a member of a storage system according to an embodiment.

An operation sequence shown in FIG. 2 includes steps of P1 to P17. An operation sequence shown in FIG. 3 includes steps of P20 to P38. An operation sequence shown in FIG. 4 includes steps of P39 to P55. An operation sequence shown in FIG. 5 includes steps of P60 to P78. An operation sequence shown in FIG. 6 includes steps of P80 to P100. An operation sequence shown in FIG. 7 includes steps of P110 to P126. An operation sequence shown in FIG. 8 includes steps of P127 to P145. An operation sequence shown in FIG. 9 includes steps of P150 to P166.

(A-2) Operation of Embodiment

It is now supposed that the storage server 10 and the remote printing server 11 are in a mutual relation between systems. FIG. 2 shows operation in the case where a user registered only in the storage server 10 as a member is made capable of using the remote printing server 11. It is now supposed that the storage server, which cooperates with the remote printing server 11, includes five storage servers, i.e., storages A to E shown in FIG. 13(B).

(A-2-1) Operation at the Time of Member Registration

With reference to FIG. 2, a confidence relation between systems is constructed and mutual use registration is conducted between systems so as to make possible mutual cooperation between the storage service and the remote printing service (P1).

After the step P1 is finished, cooperation with the storage service is registered on the remote printing service side (P2). The storage service database B1 shown in FIG. 2 is a database that stores storage IDs for identifying five storage servers (A to E), which cooperate with the remote printing server 11. The storage service database B1 may be a part of the remote printing member database 30 shown in FIG. 1.

At step P2, the storage ID of storage service that has conducted member registration of the user U1 is registered in the storage service database B1. In addition, a link button for member registration of the remote printing service is transmitted to the storage server 10 (P3).

In order to make it possible for the user U1 who has completed member registration for the storage service to get the remote printing service, the browser the user U1 is perusing on the storage server 10 side displays the link button on the screen (P5) as setting for transmission (P4) of an ID (i.e., a user ID (which is denoted by ID1) of the user U1 as a storage service member registered at P1).

The user U1 who is already perusing a page from the step P1 clicks the link button displayed on the screen. As a result, a program of event drive type having a function of transmitting the ID1 and the storage ID of the storage A to the remote printing server 11 via the storage server 10 is started. These IDS are thus transmitted to the remote printing server 11 (P6). In the case where the storage service and the remote printing service have a mutual confidence relation and cooperate with each other, a user having an ID of the storage service can log in the remote printing service as well.

As a result, the ID1 and the storage ID that indicates the storage A are delivered to the remote printing server 10 (P9). In the remote printing server 11, the ID1 and the storage ID that indicates the storage A are collated with contents stored in the storage service database B1 (P10). With respect to the user U1, therefore, it becomes possible to grasp a relation of association of the already registered storage ID (storage A) and ID1 with a user ID and a password (PW) in the remote printing server 11.

If the remote printing server 11 transmits a picture for member registration (P11), the browser of the personal computer or the portable telephone receives the picture and displays the picture. The user U1 enters the ID, password and a telephone number in corresponding fields of the picture (P12). The ID and the password become the user ID and password of the user U1 in the remote printing server 11.

Upon receiving the user ID, password and telephone number, the remote printing server 11 stores the user ID, password, and telephone number in the remote printing member database 30, and executes member registration in such a form as to associate them with the ID1 of the link source (P13).

The registered user ID, password, and telephone number are arranged as shown in, for example, FIG. 13(A) and stored. It is possible that the user ID coincides with the ID1. Considering, for example, the case where the storage server and the remote printing server 11 differ in operation start time identified in the storage A, however, the user ID does not coincide with the ID1 in many cases. As an example, in FIG. 13(B), the user ID in the remote printing server and the storage A of the user U1 is "yamamoto", whereas the user ID in the storage B is "yaya".

After the member registration at the step P13 has been executed, the remote printing server 11 causes the browser to display a picture for notifying the user U1 that the member registration of the remote printing service has been completed, on the screen (P14). Upon watching this, the user U1 recognizes the completion of the member registration (P15).

In screen display at this time, a character string, such as, for example, "member registration for the storage A and member registration for the remote printing service have been completed" is preferably displayed.

Owing to the processing heretofore described, it is possible on the remote printing server 11 side to manage the relation of association of members of the storage service with members of the remote printing service. If it is desired to manage on the storage server 10 side the association relation, however, a processing block SC1 including steps P16 and P17 surrounded by a dotted line is executed after the step P14.

At the step P16, the user ID registered in the remote printing member database 30 is transmitted to the storage server 10 of the storage A. At the step P17, registration of the user ID is conducted in the storage service member database B3 while maintaining the relation of association of the user ID with the ID1. If in this case it is not necessary to manage in the remote printing server 11 side to manage the relation of association of members of the storage service with members of the remote printing service, then the ID1 of the link source may not be stored in the remote printing member database 30.

If the provider of the storage service is the same as the provider of the remote printing service, then it is also considered that it suffices to manage the association relation by either of the servers. If the provider of the storage service is different from the provider of the remote printing service, then it is necessary to manage the association relation on both sides because the problem of charging is also involved.

Owing to the member registration heretofore described, the user U1 can register web contents, such as images, dynamic images, documents, commodity catalogues, program codes and software packages, in the storage server 10, or peruse them. In addition, it also becomes possible for the user U1 to download and peruse web contents registered and opened to the public by other persons.

Operation of the case where user U1 who has completed in member registration uses the storage system of the present embodiment will now be described with reference to FIGS. 3, 4, 5, 6, 7, 8 and 9. FIGS. 3 to 8 other than FIG. 9 show operation in the case where the remote printing server 11 is used via the storage server 10 and the web contents (i.e., the main data DA1) are output from the MMK terminal 12.

Pictures M1 to M7 shown in FIG. 10(A) to (F) and FIG. 11 are examples of display on the screen of the portable telephone.

(A-2-2) Operation at the Time of Output (when Portable Telephone is Used)

Figure 3:
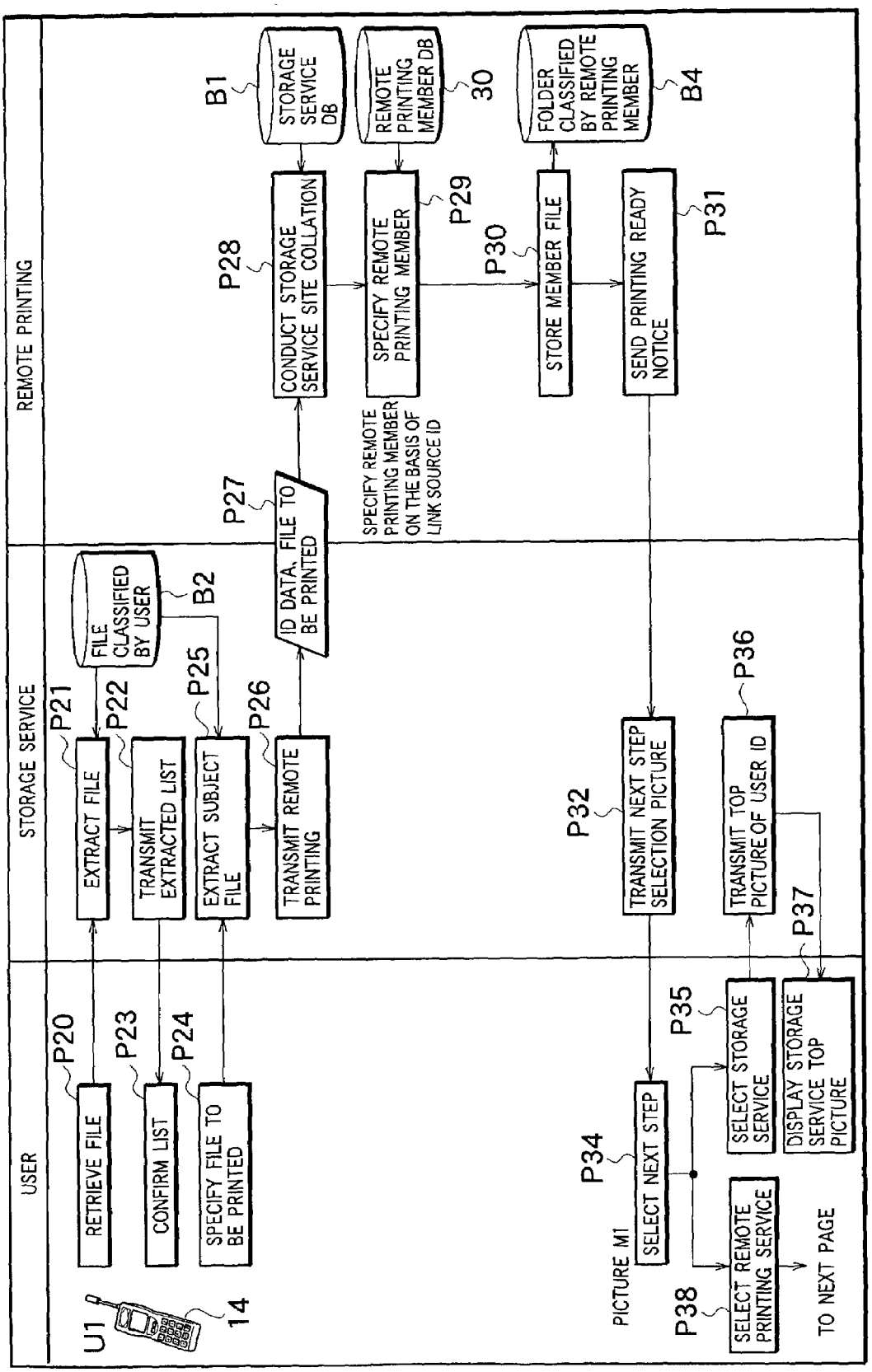
FIG. 3 shows an operation sequence at the time of registration of a member of a storage system according to an embodiment.

With reference to FIG. 3, if the user U1 inputs a URL that indicates a home directory of the user himself or herself or a directory name opened to the public, by using the browser of the portable telephone 14 (P20), then the URL is supplied to the storage server 10, and consequently the browser extracts the home directory specified by the URL or a file in the directory opened to the public (P21). One file might be extracted. For example, in the case where the user U1 does not upload a file, even one file cannot be extracted. Typically, however, a plurality of files can be extracted. Therefore, the storage server 10 forms a list of extracted files and returns the list to the browser of the portable telephone 14 (P22).

At this time, the browser can display a list of file names corresponding to the list as shown in, for example, FIG. 14, on the screen (P23). Therefore, the user U1 checks a check box while watching the list, and specifies a file to be printed (the printing can be replaced with a screen display output, but it is now denoted by printing) by, for example, pressing a "print" button (P24).

A user-classified file B2 shown in FIG. 3 is a file that accommodates the main data DA1 of the storage database 20. In the case where the data DA1 is not opened to the public, only the user U1 or a plurality of pre-specified users have an authority to access the data DA1. In the case where the data DA1 is opened to the public, all users have an access authority. In the case of the present embodiment, however, it is necessary that member registration is previously conducted in the storage service of the storage A and the remote printing service of the remote printing server 10 because of the membership system.

On the screen of FIG. 14, it is also possible to request a plurality of files to be simultaneously printed, by checking a plurality of check boxes. If the user U1 specifies only one subject file (which is denoted by F(DA1)) containing the data DA1 as a printing file at the step P24, then the storage server 10 of the storage A extracts the subject file F(DA1) from the user-classified file B2 (P25), and transmits the subject file F(DA1) to the remote printing server 11 associated at the step P17 (or P13) (P26).

If there are a plurality of cooperating remote printing servers when viewed from the storage server 10, then it is a matter of course that processing of discriminating the remote printing server becomes necessary at this stage.

Transmission of the subject file F(DA1) at the step P26 is conducted together with the ID1, which is the user ID of the user U1 in the storage server 10, and the storage ID, which identifies the storage server 10 (P27).

In other words, the step P27 is a step corresponding to the step P9, and the step P24 is a step corresponding to the step P8.

In the example of FIG. 3, printing is supposed as the output form of the subject file F(DA1). As for the output form, however, not only "printing" but also simply displaying the file on the screen of the MMK terminal 12 may be used.

Furthermore, the output destination is not necessarily limited to an MMK terminal. For example, it is also possible to transmit the file to a desired transmission destination via the remote printing server 11 in the form of electronic mail, or output the mail by using a FAX terminal.

At step P28, the storage server 10 is specified on the basis of contents stored in the storage service database B1. In the case of access from a storage server or the like that is not in the cooperation relation, specification of the storage server 10 cannot be conducted normally at the step P28, and the advance of the processing is stopped. In many protocols such as HTTP, information specifying the transmission source (such as the IP address of the transmission source) can be received in a stage before the connection (session) is established. Therefore, it is also possible to record a transmission source for which the advance of processing is stopped at the step P28 and prevent the connection for the transmission source from being established after a connection establishment request is received from the same transmission source at least a predetermined number of times.

The step P28 is processing that corresponds to the step P10.

Subsequently, at step P29, the user U1, who is a member of the remote printing service, is specified on the basis of contents stored in the remote printing member database 30 (P29). Processing in the case where the specification at the step P29 cannot be conducted may also be similar to that in the case of the step P28. Processing of the step P29 corresponds to the function of the personal authentication function section 33.

If the specification at the step P29 is conducted normally, then the data DA1 is accommodated in a file (member file) prepared on the remote printing server 11 for the user U1 who is a specified member and the file is stored in a member-classified folder B4 (P30) and a printing preparation completion notice (output preparation completion notice) is returned to the storage server 10 (P31). Upon receiving the notice, the storage server 10 transmits a next step selection picture to the browser of the portable telephone 14 (P32).

The member-classified folder B4 can be provided as apart of, for example, of the remote printing database 31.

The browser of the portable telephone 14 urges the user U1 to select the next step by displaying a received next step selection picture on the screen (P34). As a concrete configuration of the next step selection picture, various configurations can be considered. As an example, however, the picture M1 shown in FIG. 10(A) may be used.

In the example of the picture M1, "to storage top", which indicates a top page of the storage service (i.e., atop page of the storage server 10), "to remote printing", which indicates a top page of the remote printing service (i.e., a top page of the remote printing server 11), and "return to preceding picture" are prepared as selection items. "Return to preceding picture" corresponds to the case where the processing is canceled at this time. When "return to preceding picture" is selected, return to the preceding picture is effected.

Because the storage area is consumed and a cost is required in order to store the subject file F(DA1) and the remote printing server 11 is not a server aiming at storing the data DA1.

If "to storage top" is selected on the picture M1, a top page according to the ID1 corresponding to the user U1, among top pages provided by the storage server 10, is supplied from the storage server 10 to the portable telephone 14 (P36) and its picture is displayed (P37). The top page may include a list of files stored in the home directory of the user U1.

Processing that can be conducted at the step P37 and subsequent steps depends on the configuration of the top page. If the top page has, for example, a configuration shown in FIG. 14, the steps P22 to P25 and subsequent steps can be repeated once more.

Figure 4:
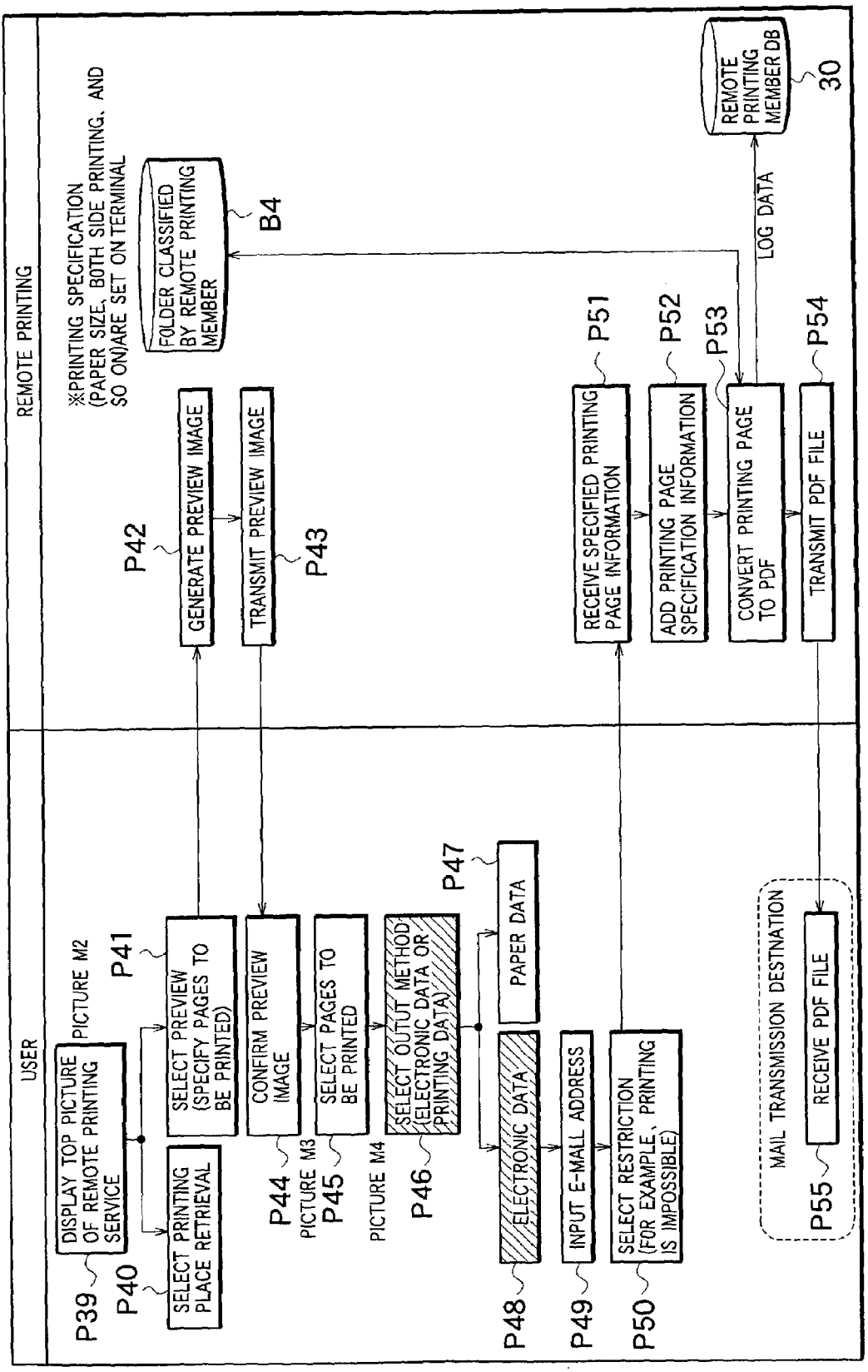
FIG. 4 shows an operation sequence of a printing file specification portion of a storage system according to an embodiment.

On the other hand, if the top page of the remote printing service is selected (P38) at the step P34, then the processing proceeds to step P39 shown in FIG. 4.

At the step P39, the top page of the remote printing server 11 is displayed on the screen of the portable telephone 14. As the configuration of the picture, various configurations can be considered. As an example, a picture M2 shown in FIG. 10(B) is supposed. "Preview", "retrieve printing place" and "return to preceding picture" are prepared as three selection items in the picture M2.

Processing conducted when "return to preceding picture" has been selected is the same as that conducted when "return to preceding picture" has been selected in the picture M1. As for processing conducted when "retrieve printing place" has been selected (P40), the processing proceeds to step P127 shown in FIG. 8 and described later. First, however, the case where "preview" has been selected will now be described.

The preview is a function for confirming a whole rough image of web contents before the printing output from the MMK terminal 12. The screen size of the portable telephone 14 is typically far smaller than that of the MMK terminal 12, and it is smaller than the size of a printed matter actually printed and output from the MMK terminal 12. However, it is convenient that the whole image can be confirmed easily anywhere in travel.

Furthermore, without being necessarily premised on printing, the whole image can be confirmed easily on the portable telephone before actually displaying the image on the MMK terminal 12. As the case may be, the purpose of the user U1 is achieved by only watching the picture displayed by the preview and it becomes unnecessary to conduct printing or displaying from the MMK terminal 12.

At step P42 following the step P41, a preview picture is generated. At a subsequent step P43, the generated preview picture is transmitted to the browser of the portable telephone 14. The preview picture displayed on the screen of the portable telephone 14 and watched by the user U1 at this time may be, for example, a picture M3 shown in FIG. 10(C) (P44).

As compared with the ordinary browser installed on personal computers, the browser of the portable telephone is typically special in language kind that can be handled (in not a few portable telephones, a page created by ordinary HTML cannot be displayed) or strict in restrictions concerning the size of a page that can be displayed. In the processing of the step P42, it is necessary to generate the preview picture M3 with due regard to these points.

On the preview picture M3, not only the preview but also a button for ordering printing is prepared. By burying the button, therefore, the user U1 who operates the portable telephone 14 can give an order to determine whether printing is to be conducted every preview having 20 pages in this example (this corresponds to the fact that the data DA1 is formed of 20 pages) (P45).

If on the preview picture it is determined for all pages whether printing is to be conducted and a predetermined selection determination operation is conducted, then the processing proceeds to step P46. The displayed picture changes to, for example, a picture M4 shown in FIG. 10(D). On the picture M4, three selection items, i.e., "FAX" (FAX terminal), "MMK" (MMK terminal), and "mail" (electronic mail) are prepared as output methods.

Figure 5:
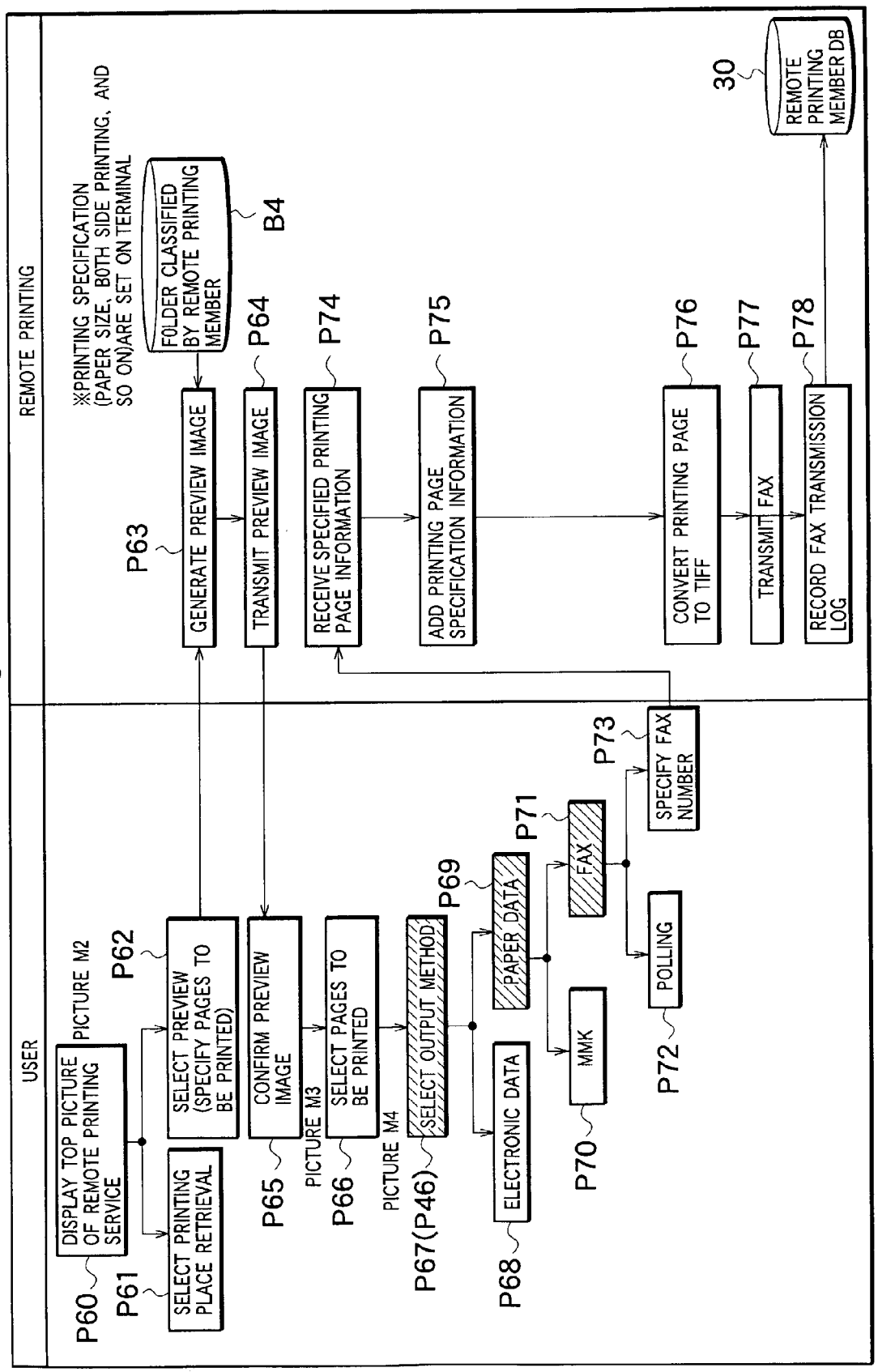
FIG. 5 shows an operation sequence of a FAX transmission portion of a storage system according to an embodiment.
Figure 6:
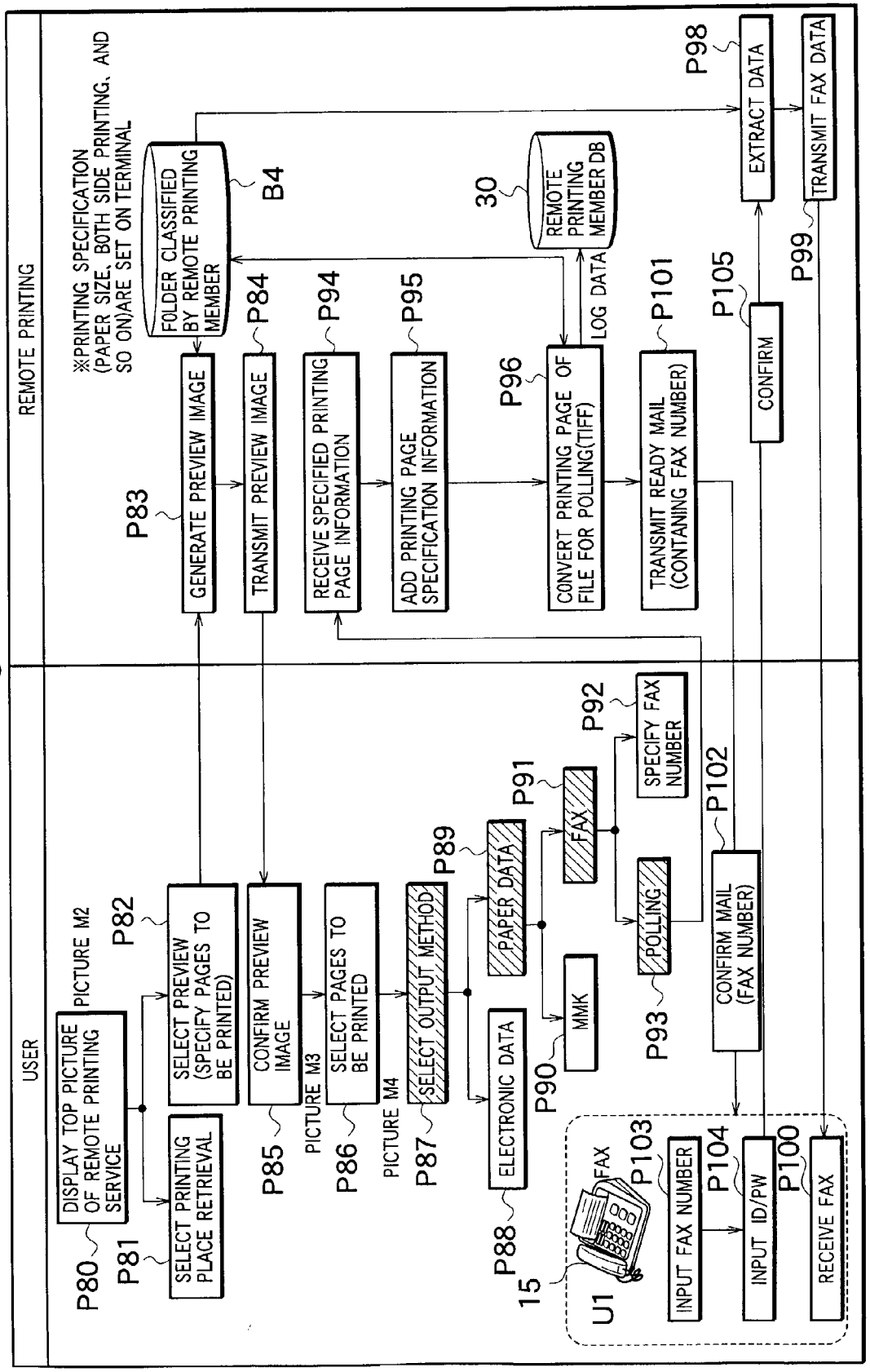
FIG. 6 shows an operation sequence of a polling portion of a storage system according to an embodiment.
Figure 7:
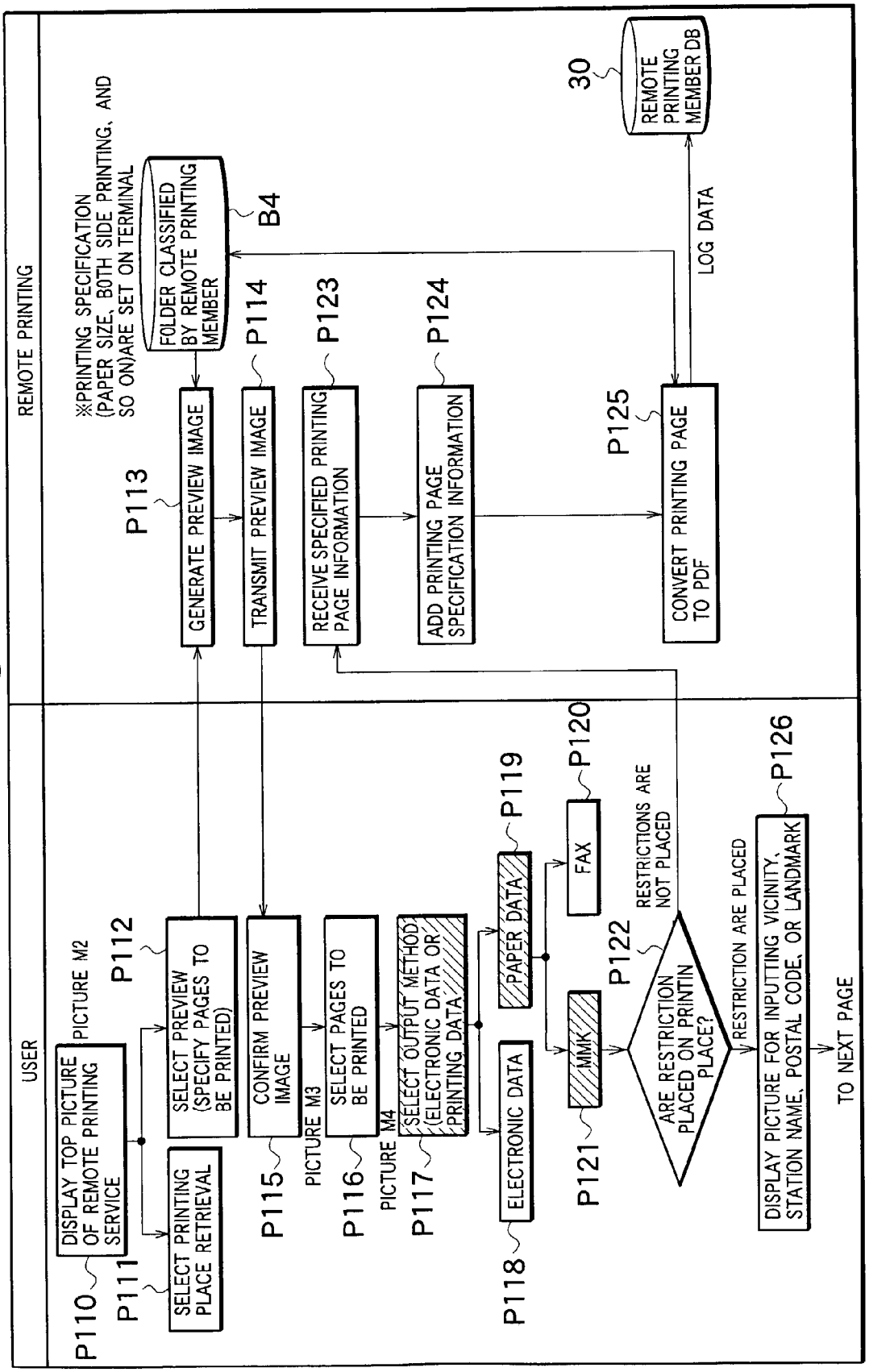
FIG. 7 shows an operation sequence of a storage system according to an embodiment in the case where printing place specification is not conducted.

The case where "FAX" or "MMK" among them is selected corresponds to paper data of the step P47. Its processing is shown in FIGS. 5, 6 and 7. First, the case where electronic data (P48), i.e., electronic mail has been selected will now be described.

At step P49, which follows the step P48, the user U1 inputs an electronic mail address that is convenient for receiving the electronic mail from the portable telephone 14 (P49). There are a large number of users having a plurality of electronic mail addresses. If, for example, an electronic mail address of the portable telephone 14 is input, then a printing output cannot be obtained and there is a possibility that it becomes impossible even to read the electronic mail because many portable telephones cannot receive an accompanying file.

Therefore, it is desirable to input such an electronic mail address that a personal computer can read the electronic mail.

If necessary, restrictions concerning the output form can be placed at step P50 following the step P49. For example, it is possible to prohibit printing.

The electronic mail may be web mail that can be read and written by using the browser.

Generation of the electronic mail depends on the function of the remote printing server 10. In accordance with specification conducted by using the picture M3 at the step P45, information concerning pages to be printed is obtained at steps P51 and P52. On the basis of the information, data of the pages to be output is taken out from among the data DA1 stored in the member-classified folder B4 and converted into the PDF (portable document format) (P53).

The PDF is a document file format that is wealthy in expressive power. In typical HTML, the browser automatically determines a major part of the location and color of character strings on pages (contents). In the PDF, however, the location and color of character strings on pages can be specified in further detail. Since the PDF can reflect faithfully the intention of a content creator, the PDF is frequently used in electronic publication and so on.

Since the PDF cannot conduct screen display by using only the function of an ordinary browser, however, it is necessary to use plug-in software (PDF file viewer).

When the file is converted into the PDF format at the step P53, an access log is stored in the remote printing member database 30. And electronic mail containing the generated PDF file is transmitted to the electronic mail address input at the step P49 (P54 and P55).

The printing page specification information added at the step P52 is used not only to specify pages when actually printing (outputting), but also to store log data, which contains a detailed record extending to even output pages as shown in FIG. 13(C), in the remote printing member database 30.

Processing in the case where the paper data is selected as the output method at the step P46 and the FAX is selected from among the paper data is shown in FIG. 5.

Step P67 in FIG. 5 corresponds to the step P46 in FIG. 4. Steps executed before and after the step P67 in FIG. 5 and steps executed before and after the step P46 in FIG. 4 are also associated with each other.

In paper data at step P69 corresponding to the step P47, there are MMK (it is now supposed that the output of the MMK terminal is a printed output) at step P70 and FAX at step P71. The user U1 now selects "FAX" on the picture M4.

As for the terminal control scheme in the FAX system, there is also polling. In FIG. 5, however, the user U1 who operates the portable telephone 14 does not select polling of step P72, but specifies a FAX number of a FAX transmission destination at step P73.

Upon receiving this, the remote printing server 11 executes processing of steps P74 to P78.

The step P74 corresponds to the step P51. The step P75 corresponds to the step P52. The step P76 corresponds to the step P53. The step P77 corresponds to the step P54. The step P78 corresponds to (a storage portion of log data) of the step P53.

Tiff used at the step P76 is an image file format that does not depend upon the operating system or the like and that is high in versatility.

On the other hand, processing conducted when the FAX number specification (P73) is not selected but the polling (P72) is selected at the step P71 is shown in FIG. 6. Step P91 in FIG. 6 corresponds to the step P71 in FIG. 5. Steps executed before and after the step P91 in FIG. 6 and steps executed before and after the step P71 in FIG. 5 are also associated with each other. In other words, the relation between FIG. 6 and FIG. 5 is similar to that between FIG. 5 and FIG. 4.

Therefore, step P93 following the step P91 corresponds to the step P72. Step P94 corresponds to the step P74. Step P95 corresponds to the step P75. Step P96 corresponds to the step P76. Thereafter, "ready" mail containing the FAX number is transmitted (P101). If "confirmation mail" reaches the user (P102), then the user inputs the FAX number of the own station (P103) and inputs ID/PW (P104). If the input ID/PW is confirmed on the remote printing service side (P105), then the data converted into the Tiff form is extracted from the remote printing member-classified folder B4 and transmitted (P98 and P99). Upon receiving this, the FAX terminal 15 reproduces the image and character string on predetermined recording paper and outputs it.

Processing conducted in the case where "MMK" has been selected on the picture M4 as the paper data of the step P89 is shown in FIG. 7.

Step P121 in FIG. 7 corresponds to the step P90 in FIG. 6. Steps executed before and after the step P121 in FIG. 7 and steps executed before and after the step P90 in FIG. 6 are also associated with each other. In other words, the relation between FIG. 7 and FIG. 6 is similar to that between FIG. 6 and FIG. 5.

Therefore, step P123 following the step P121 via (a branch "restrictions are not placed" of) step P122 corresponds to the step P72. Step P123 corresponds to the step P94. Step P124 corresponds to the step P95. Step P125 corresponds to the step P96.

At the step P122, processing for determining whether restrictions are to be placed on the printing place is conducted.

The case where a valid selection (and entering) has been conducted on the picture M5 shown in FIG. 10(E) corresponds to the case where restrictions are to be placed. The case where a valid selection (and entering) has not been conducted corresponds to the case where restrictions are not to be placed.

If the processing proceeds to a branch "restrictions are placed" from the step P122, then some item is selected on the picture M5. If at this time the selected item is "station", "landmark", or "postal code" other than "vicinity (location confirmation)", then the user U1 conducts inputting by using a natural language (or numerals) concerning the pertinent item (P126).

The "vicinity" refers to a vicinity of (a location as close as possible to) the current location of the user U1 carrying the portable telephone 14. The "station" refers to a concrete name of a station of a railroad or the like. The "landmark" refers to a concrete name of a conspicuous building or the like. The postal code is used when a postal code is used to specify a geographical region.

Besides, a geographical region can also be specified by inputting, for example, an address.

Figure 8:
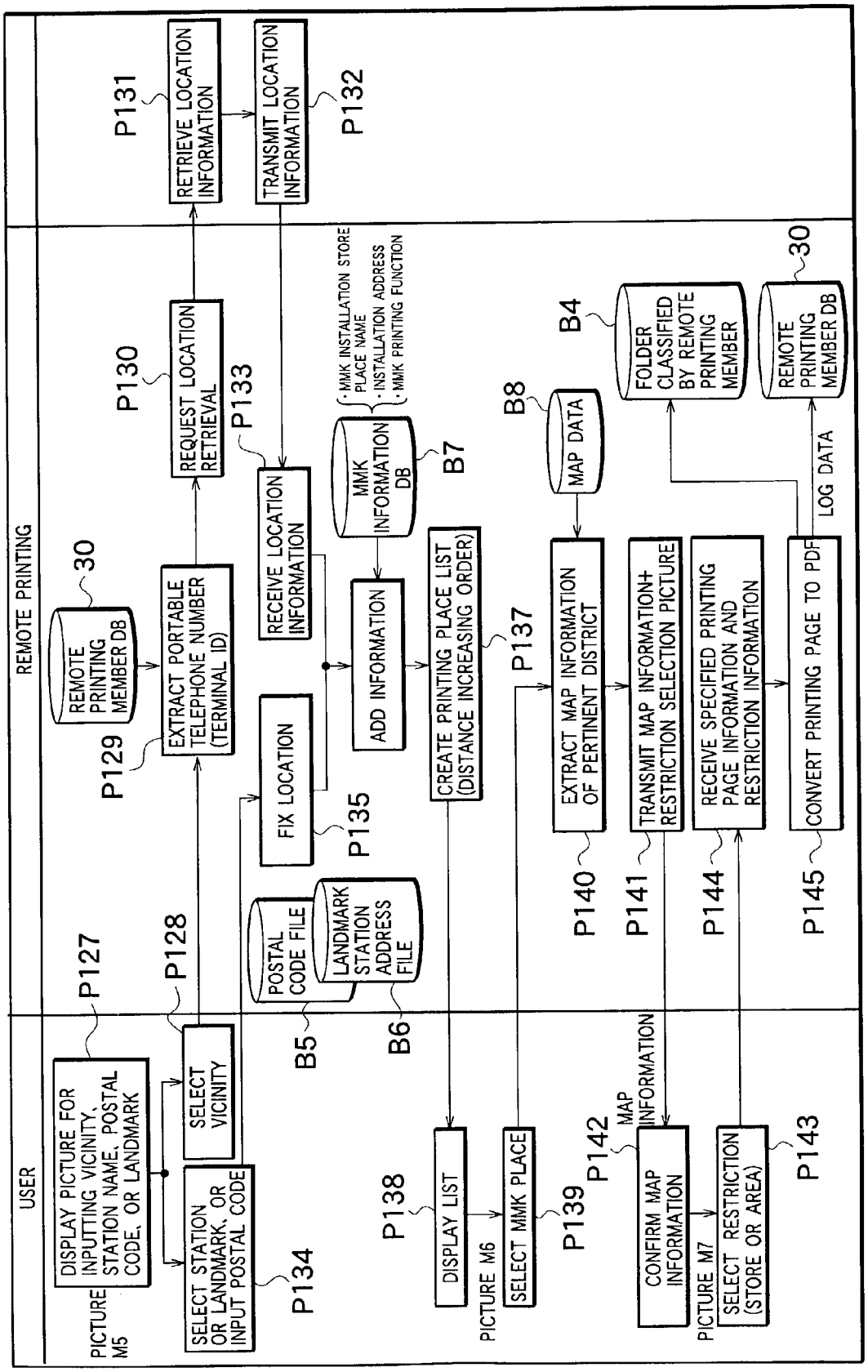
FIG. 8 shows an operation sequence of a storage system according to an embodiment in the case where printing place specification is conducted on an MMK terminal.
Figure 9:
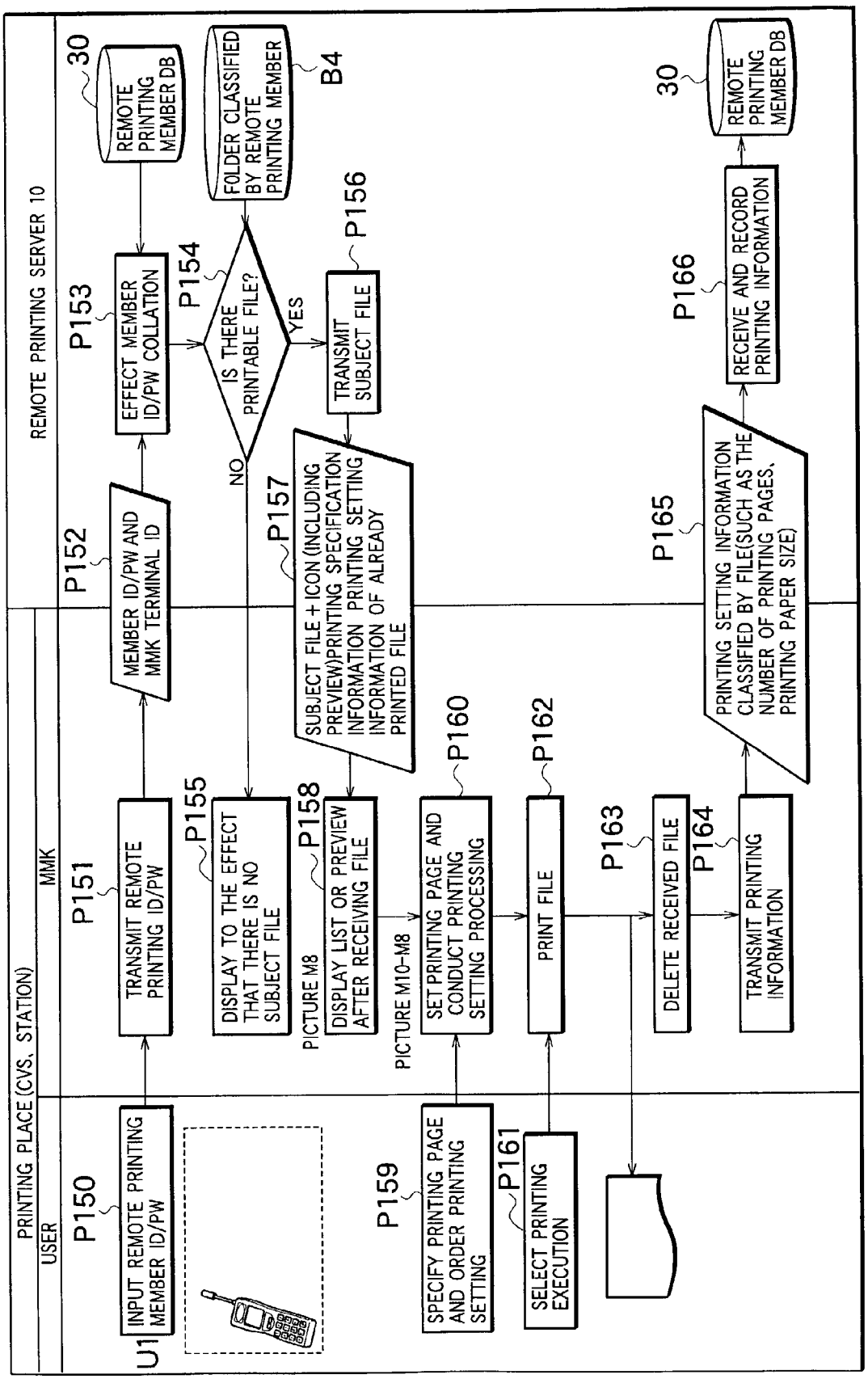
FIG. 9 shows an operation sequence of a storage system according to an embodiment in the case where printing place specification is conducted on an MMK terminal.

The step P126 corresponds to the step P127 shown in FIG. 8. Subsequent steps shown in FIG. 8 are executed.

(A-2-2-1) Operation when Printing Place has been Specified

With reference to FIG. 8, if the user U1 operating the portable telephone 14 selects "vicinity (location confirmation)" on the picture M5 (P128), then the remote printing server 11 retrieves a telephone number of the portable telephone 14 from the remote printing member database 30 (P129), and requests the portable telephone network to which the portable telephone 14 belongs to conduct location retrieval by delivering the obtained telephone number as a retrieval key (P130).

Within the portable telephone network, location information of portable telephones (one of them is the portable telephone) is stored for the purpose of conducting ringing. Therefore, a telephone number serving as a retrieval key is received and location information is retrieved (P131). The obtained information is returned to the remote printing server 11 (P132 and P133).

The telephone number of the portable telephone 14 used as the retrieval key is the telephone number registered in the remote printing member database 30 at the steps P12 and P14. If the selection item of "vicinity (location confirmation)" is not provided on the picture M5, therefore, then the registration of the telephone number can also be omitted.

On the other hand, if a selection item other than "vicinity (location confirmation)" is selected at the step P127, then the processing proceeds from the step P127 to P134. According to a concrete name of a station, a concrete name of a landmark, a postal code, or the like, an address corresponding to the desire of the user U1 is retrieved from a postal code file B5 or a landmark station address file B6 (P135).

The postal code file B5 is a database in which an address (location) can be retrieved by using a postal code as a retrieval key. In the same way, the landmark station address file B6 is a database in which an address can be retrieved by using a name of a landmark or a station. These files B5 and B6 can be provided in the remote printing database 31.

In the same way as the step P133, step P136 is executed in the wake of the step P135.

At step P136, retrieval is conducted in an MMK information database B7 on the basis of the location information (address reflecting the user's desire) obtained at the step P133 or P135. In the MMK information database B7, detailed information concerning MMK terminals, such as addresses of installation places of the MMK terminals, function specifications of the MMK terminals, and names of the MMK terminals (names that reflect names of installation stores and installation places and that are easy to understand), is stored. The MMK information database B7 can be provided as a part of the remote printing database 31.

All function specifications of the MMK terminals can be unified so as to become the same. An MMK terminal group as a whole is an infra-structure of a considerably large scale. Extension is conducted little by little with the years. Therefore, it is considered that operation is conducted in such a form that new and old MMK terminals are included mixedly in the same system. In other words, the possibility that various MMK terminals, such as MMK terminals having high functions, MMK terminals having low functions, MMK terminals having a small number of functions, and MMK terminals having a large number of functions, are mixedly included is high.

For example, as function specifications, there are conditions such as whether both side printing is possible, whether color printing is possible, and whether special size paper is possible. These conditions are selected by the user as parameters for MMK selection.

If an MMK terminal is installed in an address that perfectly agrees with the location information obtained at the step P133 or P135, then simple retrieval can be executed. In other cases, however, it becomes necessary to conduct processing of calculating a difference between the location information and an address of an installation place of each MMK terminal stored in the MMK information database B7, narrowing down MMK terminals having a small difference, and effecting a selection.

When the number of installed MMK terminals is small, an MMK terminal is not installed in a place desired by the user U1 and indicated by the location information, and consequently the possibility that it becomes necessary to conduct operation of narrowing down some candidates by using the difference is high. If the number of installed MMK terminals becomes large, however, then the probability that there is an MMK terminal installed in a place that agrees with the location information becomes high and such narrowing down can be omitted, resulting in simple processing. In general, it is considered that the number of installed MMK terminals tends to increase as the operation time of the storage system of the present embodiment becomes long.

Even if there is an MMK terminal installed in a place that agrees with the location information, however, it is a matter of course that the user U1 may be notified of a list of some MMK terminals installed in the vicinity. Since it is possible to input a name of an unknown station or a name of an unknown landmark, there is a possibility that the user U1 cannot find a more desirable MMK terminal until the user U1 watches the list of MMK terminals.

The list created according to the retrieval result of the step P136 is arranged in order of increasing distance from the location information (P137), and the result of the arrangement is returned to the portable telephone 14. In the portable telephone 14, the list is displayed on the screen (P138). A picture displayed at this time may be, for example, a picture M6 shown in FIG. 10(F).

If the user U1 of the portable telephone 14 selects, for example, an MMK terminal installed in "amam Kanasugibashi store" as in an example of FIG. 10(F) (P139), then map information of the pertinent district is retrieved from a map database B8 in the remote printing server 11 (P140), and data formed by combining the map information with a restriction selection picture is returned to the portable telephone 14 (P142).

Figure 11:
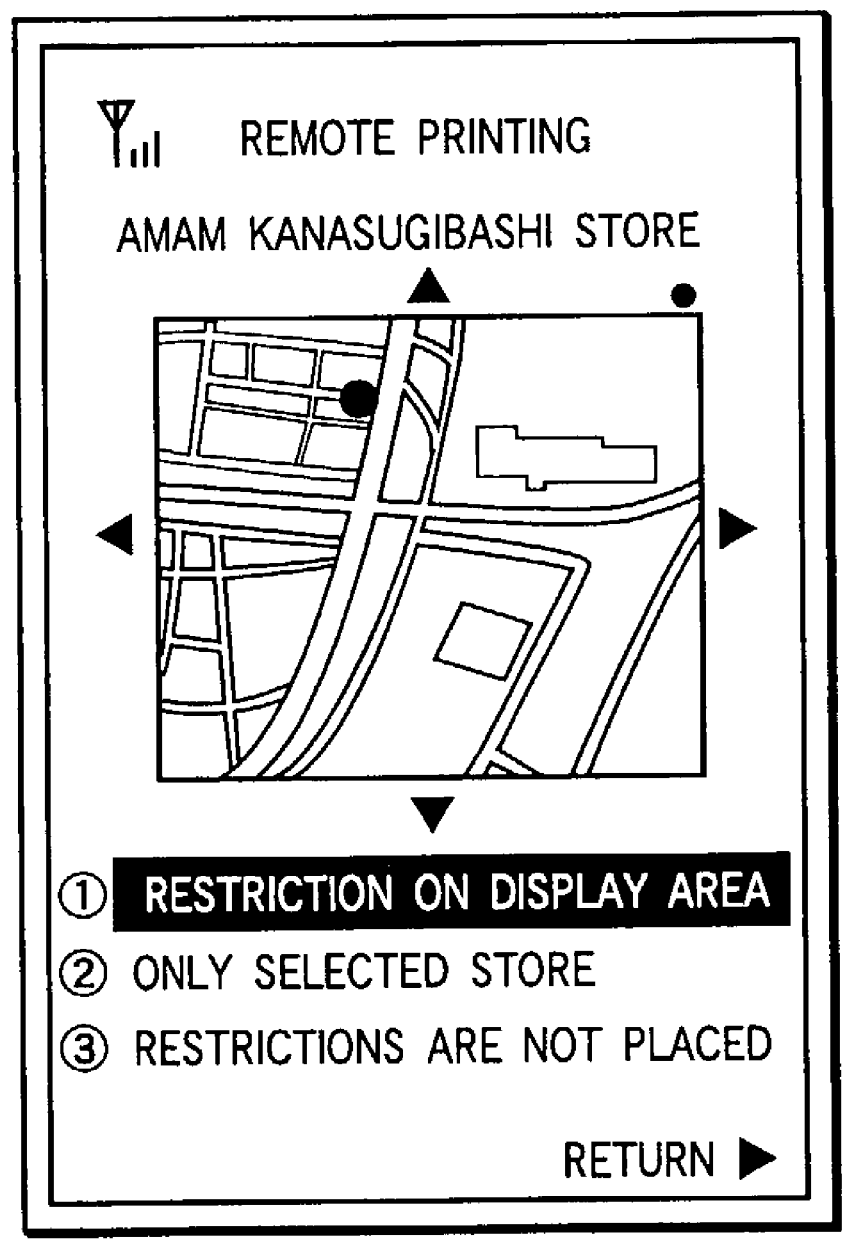
FIG. 11 is a schematic diagram showing an example of a display screen on an MMK terminal in a storage system according to an embodiment.

A picture displayed on the portable telephone 14 at this time may be, for example, a picture M7 shown in FIG. 11.

In the picture M7, it is also possible to display any of regions adjacent to the geographical region that is currently being displayed, respectively in the directions of east, west, south and north. It is thus possible to confirm locations of all MMK terminals in the list displayed in the picture M6 that cannot be accommodated in the geographical region that is currently being displayed. Furthermore, it is also possible to display an enlarged view of only the vicinity of the selected "amam Kanasugibashi store".

If the restriction to the inside of the geographical region that is currently being displayed and an MMK terminal installed in the "amam Kanasugibashi store" is selected (P143), then the remote printing server 11 is notified to that effect, and processing of steps P144 and P145 is executed.

The step P144 correspond to the steps P123 and P124, and the step P145 corresponds to the step P125.

In the processing of FIGS. 2 to 8 heretofore described, the portable telephone 14 plays an important role in outputting. Processing of FIG. 9 can be executed by only operating the MMK terminal without using the portable telephone 14. In this processing, the storage server 10 does not intervene.

(A-2-2-3) Operation at the Time of Outputting (the Case where Portable Telephone is not Used)

With reference to FIG. 9, if the user U1 inputs the ID and password of himself or herself given as a remote printing member, by operating the MMK terminal 12 (P150), then the MMK terminal 12 adds an MMK terminal ID for identifying the MMK terminal 12 itself to the ID and password and transmits them to the remote printing server 11 (P151 and P152).

Upon receiving them, the remote printing server 11 collates them with contents stored in the remote printing member database 30 (P153). Only when there are agreeing ID and password stored in the remote printing member database 30, the user U1 is regarded as a legal user and the processing proceeds to the next step P154.

Processing conducted in the case where there are not agreeing ID and password stored in the remote printing member database 30 may be similar to that conducted in the case where the advance of the processing is stopped at the steps P28 and P29.

As a matter of course, a step of effecting collation of the MMK terminal ID and verifying the legality of the MMK terminal 12 itself may be disposed before or after the step P153.

At the step P154, a printable file is retrieved in the member-classified folder B4 of the user U1. If a valid retrieval result is not obtained, then the MMK terminal 12 under operation is made to display to the effect that there is no subject file (P155). If a valid retrieval result is obtained, then the file and/or the attribute information (or a part of the attribute information) concerning the file is returned to the MMK terminal 12 (P156 and P157).

Upon receiving this, the MMK terminal 12 temporarily stores all received data (file and/or its attribute information) in its own storage device, and conducts predetermined screen display. The picture may be, for example, a picture M8 shown in FIG. 12(A) (P158).

In the picture M8, a list of file names are arranged in a vertical direction in its central portion. In addition, three push buttons arranged in the horizontal direction are displayed in the bottom portion. Each of these files is created by presentation software, and may be contents that contain drawings and images and the are wealthy in representative power.

Figure 12:
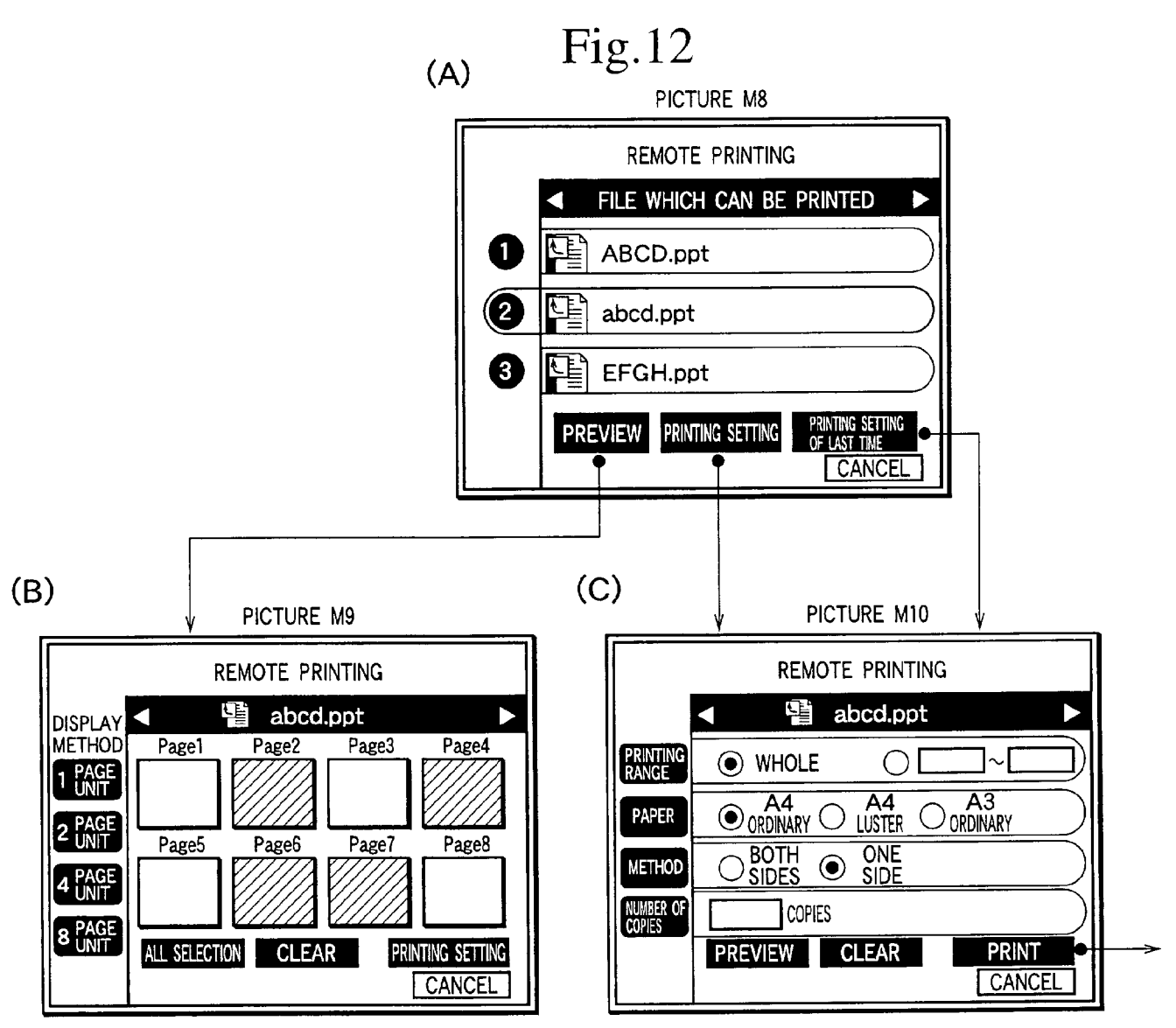

Among the three push buttons, "preview" button is a button for displaying a preview picture, such as a picture M9 shown in FIG. 12(B), as regards each of pages included in a file ("abcd.ppt") selected on the picture M8. "Printing setting" button is a button for displaying a printing setting picture, such as a picture M10 shown in FIG. 12(C), as regards a file ("abcd.ppt") selected on the picture M8.

"Clear" button in the pictures M9 and M10 is a button for clearing displayed contents. If the "printing setting" button is pressed on the picture M9, then it becomes possible to display the picture M10 and conduct the printing setting (P160). On the contrary, if the "preview" button is pressed on the picture M10, then it becomes possible to display the picture M9 and conduct the previewing (P160).

Furthermore, if "the last printing setting" button is pressed on the picture M8, then on a picture M10 displayed immediately thereafter, setting of the last time is automatically reproduced. Therefore, it is possible to omit the input operation for printing setting.

"All selection" button on the picture M9 is a button for ordering all pages of the "abcd.ppt" to be selected in the preview. "Print" button on the picture M10 is a button for ordering printing to be conducted by the MMK terminal under operation.

If the "print" button is pressed (P161), then the MMK terminal 12 operated by the user U1 executes print outputting in accordance with the previously conducted printing setting (P162). After the print outputting, the received data stored in the storage device in the MMK terminal 12 is deleted (P163).

Furthermore, information to the effect that the printing has been executed is transmitted from the MMK terminal 12 to the remote printing server 11 (P164). Therefore, the remote printing server 11 can also grasp the fact.

Since this information includes printing setting information (such as the number of printing pages and size of printing paper) classified by file (P165), detailed log data can be stored in the remote printing member database 30 (P166). The printing setting information stored at this time may be utilized when the "the last printing setting" button is pressed at the time of the next printing.

If necessary, the file and attribute information in the remote printing member folder B4 corresponding to the printed file may be deleted at this time.

The ID and password inputting at the step P150 may be conducted by utilizing radio communication of Bluetooth or the like. If mutual connectivity between different machine kinds can be ensured, the Bluetooth can be anticipated as a radio interface that is very high in convenience to the present embodiment as well.

(A-3) Effects of the Embodiment

As heretofore described, according to the present embodiment, an MMK terminal or the like disposed anywhere in the streets is used for final outputting (such as printing outputting) while utilizing a portable telephone, which is excellent in mobility. Therefore, the outputting function that is insufficient in the portable telephone can be made up for. Each user can receive the output in a convenient place.

Typically, MMK terminals are disposed in a fixed manner. Since the MMK terminals are anywhere in the streets, however, the user can receive the output from an MMK terminal in an arbitrary installation place selected freely by the user. Substantially, the MMK terminals can be considered to have mobility close to that of the portable telephone.

In the present embodiment, therefore, it becomes possible to fully utilize data stored in the storage server and obtain a high degree of sharing, resulting in convenience to use and high mobility.

If member registration is conducted in the storage server, then member registration is automatically conducted in the remote printing server as well in the present embodiment. Even in remote printing service newly started in service, therefore, a sufficient number of registered members can be ensured. The embodiment is thus desirable in operation.

(B) Other Embodiments

In the present embodiment, the storage server 10 lies between the portable telephone 14 and the remote printing server 11. However, the portable telephone 14 and the remote printing server (corresponding to 11) may communicate with other without intervention of the storage server 10.

As a variant belonging to the category of this configuration, the following configuration is desirable.

The remote printing server is formed so as to provide the portable telephone with an interface serving as a web server and provide the storage server with an interface serving as a web browser. In the case where the remote printing server is accessed from the portable telephone by using the browser, there is provided an opportunity of declaring the intention as to whether access to the storage server is requested by transmitting a predetermined form from the remote printing server to the portable telephone. If the intention to the effect that access is requested is declared by entering a URL of a desired storage server in a predetermined field of the form, then the remote printing server accesses the storage server by using the interface serving as a web browser and utilizing the URL, and reads desired data stored in the storage server. The data thus read is output from a remote printer terminal. (The remote printer (such as an MMK terminal) is preferably specified beforehand from the portable telephone by using the form.)

A greatest advantage of the variant is that it is not necessary to expand or change the function at all on the existing storage server.

No matter whether the protocol is the HTTP protocol or the FTP protocol, the protocol is designed so that data will be typically downloaded to the accessing client terminal. (Therefore, the browser is formed so as to transmit information required to suitably download data to the accessing client terminal, such as the IP address, browser name, and version, to the web server irrespective of the user's intention and automatically.) When transmitting data to a third communication device (remote printing server in the embodiment) different from the accessing client terminal (portable telephone), therefore, it is necessary in the embodiment to expand the function of the existing storage server. In this variant, however, the necessity is not needed.

The portable telephone used in the embodiment can be replaced with another portable information terminal such as a PHS terminal.

In the embodiment, the storage server 10 and the remote printing server 11 are provided separately (in different sites). For example, in the case where the service provider is the same, however, it is natural to provide them in the same site.

As heretofore described, according to the present invention, it is possible to provide an information storage output system and information storage output service that are convenient to use and excellent in mobility.

This application claims priority from Japanese Patent Application 2001-335428, filed Oct. 31, 2001 which is incorporated herein by reference in its entirety.

What is claimed is:

1. An information output method for outputting predetermined data through a network, the network comprising:
- a storage server for storing predetermined data, the storage server having a first authentication section which permits first registered users to use the storage server;
- a portable output request terminal for a user to transmit an output request via the network of the predetermined data stored in the storage server;
- a remote print server for supplying print data relating to the predetermined data stored in the storage server when the user of the portable output request terminal transmits the output request to the storage server, the remote print server having a second authentication section which permits second registered users to use the remote print server; and
- a plurality of remote output terminals for outputting the predetermined data based on the print data from the remote print server;
- wherein the storage server is coupled to the remote print server via the network;
- wherein the storage server and the remote print server cooperate in sharing information relating to the first registered users and the second registered users,
- wherein the storage server and the remote print server maintain relation of association for a user identity of the user registered as the first registered user with a different user identity of the user registered as the second registered user; and the method comprising:
- performing a first authenticating, by the first authenticating section, which authenticates if the user is one of the first registered users after receiving the output request from the user via the portable output request terminal;
- permitting the user authenticated by the first authenticating section to access the remote print server without performing a second authenticating;
- sending the predetermined data that is requested by the user to the remote print server;
- performing the second authenticating, by the second authenticating section, which authenticates if the user is one of the second registered users;
- permitting the user authenticated by the second authenticating section to access the storage server without performing the first authenticating; and
- permitting the user authenticated by the second authenticating section to print the predetermined data sent as the print data from the remote print server through the one of the remote output terminals.

2. The method according to claim 1, wherein the network further comprises:
- a plurality of storage servers for storing predetermined data, each of the plurality of storage servers having the first authentication section which permits the first registered users to use the plurality of storage servers; and
- a remote output server, wherein the method further comprises:
- managing, by the remote output server, storage server information and user identification information for the plurality of storage servers, the storage server information being indicative as to whether or not a respective storage server is a cooperating storage server that allows cooperation with the remote print server; and
- when a cooperation is attempted by one of the plurality of storage servers, determining, by the remote output server, whether the one of the plurality of storage servers is a cooperating storage server.

3. The method according to claim 2, wherein the cooperation made by the one of the plurality of storage servers corresponds to at least one of a user registration and a remote printing.

4. The method according to claim 1, wherein each of plurality of storage servers is capable of performing member registration, and wherein, when member registration for a particular user is conducted in one of the remote print server and the storage server, the member registration for the particular user is automatically conducted in the other of the remote print server and the storage server.

5. An information output system for a network, comprising:
- a storage server for storing predetermined data, the storage server having a first authentication section which permits first registered users to use the storage server;
- a portable output request terminal for a user to transmit an output request via the network of the predetermined data stored in the storage server;
- a remote print server for supplying print data relating to the predetermined data stored in the storage server when the user of the portable output request terminal transmits the output request to the storage server, the remote print server having a second authentication section which permits second registered users to use the remote print server; and
- a plurality of remote output terminals for outputting the predetermined data based on the print data from the remote print server;
- wherein the storage server is coupled to the remote print server via the network;
- wherein the storage server and the remote print server cooperate in sharing information relating to the first registered users and the second registered users,
- wherein the storage server and the remote print server maintain relation of association for a user identity of the user registered as the first registered user with a different user identity of the user registered as the second registered user;
- wherein the first authenticating section of the storage server performs an authenticating to determine whether or not the user is one of the first registered users after receiving the output request from the user via the portable output request terminal,
- wherein the user authenticated by the first authenticating section as being one of the first registered users is permitted to access the remote print server without performing a second authenticating,
- wherein the predetermined data that is requested by the user is sent to the remote print server,
- wherein the remote print server performs the second authenticating to determine whether or not the user is one of the second registered users, wherein the user authenticated by the second authenticating section is permitted to access the storage server without performing the first authenticating, and wherein the user authenticated by the second authenticating section as being one of the second registered users is allowed to print the predetermined data sent as the print data from the remote print server through the one of the remote output terminals.

6. The system according to claim 5, further comprising:

a plurality of storage servers for storing predetermined data, each of the plurality of storage servers having the first authentication section which permits the first registered users to obtain information stored in the plurality of storage servers; and a remote output server, wherein the remote output server manages storage server information and user identification information for the plurality of storage servers, the storage server information being indicative as to whether or not a respective storage server is a cooperating storage server that allows cooperation with the remote print server; and wherein, when a cooperation is attempted by one of the plurality of storage servers, the remote output server determines whether the one of the plurality of storage servers is a cooperating storage server.

7. The system according to claim 6, wherein the cooperation made by the one of the plurality of storage servers corresponds to at least one of a user registration and a remote printing.

8. The system according to claim 5, wherein each of plurality of storage servers is capable of performing member registration, and wherein, when member registration for a particular user is conducted in one of the remote print server and the storage server, the member registration for the particular user is automatically conducted in the other of the remote print server and the storage server.

9. A computer program product embodied in computer readable medium and, when executed on a computer provided on a network, causing the computer to perform the following steps, wherein the network comprises:

a storage server for storing predetermined data, the storage server having a first authentication section which permits first registered users to use the storage server;

a portable output request terminal for a user to transmit an output request via the network of the predetermined data stored in the storage server;

a remote print server for supplying print data relating to the predetermined data stored in the storage server when the user of the portable output request terminal transmits the output request to the storage server, the remote print server having a second authentication section which permits second registered users to use the remote print server; and a plurality of remote output terminals for outputting the predetermined data based on the print data from the remote print server;

wherein the storage server is coupled to the remote print server via the network;

where in the storage server and the remote print server cooperate in sharing information relating to the first registered users and the second registered users, wherein the storage server and the remote print server maintain relation of association for a user identity of the user registered as the first registered user with a different user identity of the user registered as the second registered user; and the method comprising:

performing a first authenticating, by the first authenticating section, which authenticates if the user is one of the first registered users after receiving the output request from the user via the portable output request terminal;

permitting the user authenticated by the first authenticating section to access the remote print server without performing a second authenticating;

sending the predetermined data that is requested by the user to the remote print server;

performing the second authenticating, by the second authenticating section, which authenticates if the user is one of the second registered users;

permitting the user authenticated by the second authenticating section to access the storage server without performing the first authenticating; and permitting the user authenticated by the second authenticating section to print the predetermined data sent as the print data from the remote print server through the one of the remote output terminals.

10. The computer program product according to claim 9, wherein the network further comprises:

a plurality of storage servers for storing predetermined data, each of the plurality of storage servers having the first authentication section which permits the first registered users to use the plurality of storage servers; and a remote output server, wherein the method further comprises:

managing, by the remote output server, storage server information and user identification information for the plurality of storage servers, the storage server information being indicative as to whether or not a respective storage server is a cooperating storage server that allows cooperation with the remote print server; and when a cooperation is attempted by one of the plurality of storage servers, determining, by the remote output server, whether the one of the plurality of storage servers is a cooperating storage server.

11. The computer program product according to claim 10, wherein the cooperation made by the one of the plurality of storage servers corresponds to at least one of a user registration and a remote printing.

12. The computer program product according to claim 9, wherein each of plurality of storage servers is capable of performing member registration, and wherein, when member registration for a particular user is conducted in one of the remote print server and the storage server, the member registration for the particular user is automatically conducted in the other of the remote print server and the storage server.

* * * * *